United States Patent
Chang et al.

(10) Patent No.: US 10,743,229 B2
(45) Date of Patent: *Aug. 11, 2020

(54) COMMUNICATION CONTROL METHOD

(71) Applicant: KYOCERA Corporation, Kyoto (JP)

(72) Inventors: Henry Chang, San Diego, CA (US); Yushi Nagasaka, Ritto (JP); Kugo Morita, Yokohama (JP); Fangwei Tong, Kyoto (JP); Masato Fujishiro, Yokohama (JP); Chiharu Yamazaki, Tokyo (JP); Hiroyuki Adachi, Kawasaki (JP); Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,362

(22) Filed: Feb. 19, 2019

(65) Prior Publication Data
US 2019/0182739 A1 Jun. 13, 2019

Related U.S. Application Data

(63) Continuation of application No. 15/650,620, filed on Jul. 14, 2017, now Pat. No. 10,251,109, which is a
(Continued)

(51) Int. Cl.
*H04W 36/22* (2009.01)
*H04W 48/18* (2009.01)
*H04W 48/06* (2009.01)

(52) U.S. Cl.
CPC ........... *H04W 36/22* (2013.01); *H04W 48/06* (2013.01); *H04W 48/18* (2013.01); *Y02D 70/126* (2018.01); *Y02D 70/14* (2018.01)

(58) Field of Classification Search
CPC ....... H04W 88/06; H04W 4/02; H04W 28/08; H04W 48/10; H04W 48/14; H04W 48/12;
(Continued)

(56) References Cited

U.S. PATENT DOCUMENTS

| 8,493,887 | B2 | 7/2013 | Palanki et al. |
| 8,954,075 | B2 | 2/2015 | Paterson |

(Continued)

FOREIGN PATENT DOCUMENTS

| JP | 2004-320473 A | 11/2004 |
| JP | 2005-184824 A | 7/2005 |

(Continued)

OTHER PUBLICATIONS

An Office Action issued by the Japanese Patent Office dated Jun. 6, 2017, which corresponds to Japanese Patent Application No. 2017-025938 and is related to U.S. Appl. No. 14/761,873; with English language concise explanation.
(Continued)

*Primary Examiner* — Jung Liu
(74) *Attorney, Agent, or Firm* — Studebaker & Brackett PC

(57) ABSTRACT

A base station and method thereof includes transmitting from the base station to a user equipment, parameters for an offload from the cellular RAN to a wireless local area network (LAN). The parameters are used by the user equipment to perform an access network selection between the cellular RAN and the wireless LAN, and include a first threshold for comparison with a cellular signal strength of the cellular RAN, a second threshold for comparison with a wireless LAN signal strength of the wireless LAN, and a third threshold for comparison with a load of the wireless LAN. When performing access network selection, the parameters may cause the user equipment to perform the
(Continued)

offload, in response to the cellular signal strength being lower than the first threshold, the wireless LAN signal strength being higher than the second threshold, and the load of the wireless LAN being lower than the third threshold.

4 Claims, 26 Drawing Sheets

Related U.S. Application Data continuation of application No. 14/761,873, filed as application No. PCT/JP2014/050836 on Jan. 17, 2014, now Pat. No. 9,749,922.

(60) Provisional application No. 61/864,206, filed on Aug. 9, 2013, provisional application No. 61/754,106, filed on Jan. 18, 2013.

(58) Field of Classification Search
CPC ... H04W 48/18; H04W 48/08; H04W 92/045; H04W 56/0015; H04W 36/14; H04W 36/0072; H04L 12/189; H04L 12/1895; Y02B 60/50
See application file for complete search history.

(56) References Cited

U.S. PATENT DOCUMENTS

| | | | |
|---|---|---|---|
| 9,148,887 | B2 | 9/2015 | Iwamura et al. |
| 2003/0119508 | A1 | 6/2003 | Gwon et al. |
| 2004/0176024 | A1 | 9/2004 | Hsu et al. |
| 2005/0153692 | A1 | 7/2005 | Hwang et al. |
| 2006/0039332 | A1 | 2/2006 | Kotzin |
| 2009/0125630 | A1 | 5/2009 | Gogic |
| 2010/0323698 | A1 | 12/2010 | Rune et al. |
| 2011/0105109 | A1 | 5/2011 | Uemura et al. |
| 2011/0130143 | A1 | 6/2011 | Mori et al. |
| 2011/0286437 | A1 | 11/2011 | Austin et al. |
| 2012/0270538 | A1 | 10/2012 | Meylan et al. |
| 2013/0039343 | A1 | 2/2013 | Hori et al. |
| 2013/0053042 | A1 | 2/2013 | Tanikawa et al. |
| 2013/0073710 | A1 | 3/2013 | Lee |
| 2013/0088983 | A1* | 4/2013 | Pragada ............... H04W 16/14 370/252 |
| 2013/0143542 | A1* | 6/2013 | Kovvali ............... H04W 48/18 455/418 |
| 2013/0157659 | A1 | 6/2013 | Ikeda et al. |
| 2013/0163463 | A1* | 6/2013 | Grayson ............ H04L 43/0876 370/253 |
| 2013/0190012 | A1 | 7/2013 | Suzuki et al. |

FOREIGN PATENT DOCUMENTS

| | | |
|---|---|---|
| JP | 2006-060818 A | 3/2006 |
| JP | 2010-147916 A | 7/2010 |
| JP | 2011-041319 A | 2/2011 |
| JP | 2011-504681 A | 2/2011 |
| JP | 2011-172295 A | 9/2011 |
| JP | 2011-239032 A | 11/2011 |
| JP | 2012-044234 A | 3/2012 |
| JP | 2012-514435 A | 6/2012 |
| JP | 2012-227884 A | 11/2012 |
| JP | 2013-502083 A | 1/2013 |
| WO | 2009/022534 A1 | 2/2009 |
| WO | 2009/150943 A1 | 12/2009 |
| WO | 2011/110108 A1 | 9/2011 |
| WO | 2011/118196 A1 | 9/2011 |
| WO | 2011/149533 A1 | 12/2011 |
| WO | 2012/024346 A1 | 2/2012 |
| WO | 2012/032782 A1 | 3/2012 |
| WO | 2012/043803 A1 | 4/2012 |
| WO | 2012/060934 A2 | 5/2012 |
| WO | 2012/064067 A2 | 5/2012 |

OTHER PUBLICATIONS

Extended European Search Report (EESR) dated Dec. 19, 2016 from corresponding EP Appl No. 14740441.2, 10 pp.
Softbank Mobile; "Introduction of Japanese Regulatory Requirements to LTE Band 8 (R9)"; 3GPP; TSG-RAN Meeting #57; RP-121445; Sep. 4-7, 2012; Chicago, USA.
An Office Action; "Notice of Reasons for Rejection," issued by the Japanese Patent Office dated Oct. 13, 2015, which corresponds to Japanese Patent Application No. 2014-557513 and is related to U.S. Appl. No. 14/761,873; with English language statement of relevance.
An Office Action; "Notice of Reasons for Rejection," issued by the Japanese Patent Office dated Mar. 8, 2016, which corresponds to Japanese Patent Application No. 2014-557513 and is related to U.S. Appl. No. 14/761,873; with English language statement of relevance.
The partial supplementary European search report issued by the European Patent Office dated Sep. 16, 2016, which corresponds to European Patent Application No. 14740441.2-1854 and is related to U.S. Appl. No. 14/761,873.
International Search Report issued in PCT/JP2014/050836; dated Apr. 17, 2014.
New Study Item Proposal on WLAN/3GPP Radio Interworking; Intel Corporation; dated Sep. 13-15, 2012; Agenda Item 13.2.
An Office Action issued by the Japanese Patent Office dated Aug. 9, 2016, which corresponds to Japanese Patent Application No. 2015-243644 and is related to U.S. Appl. No. 14/761,873; with English language statement of relevance.

* cited by examiner

COMMUNICATION CONTROL METHOD

CROSS REFERENCE TO RELATED APPLICATIONS

This application is a Continuation Application of U.S. patent application Ser. No. 15/650,620 filed Jul. 14, 2017, which is a Continuation Application of U.S. patent application Ser. No. 14/761,873 filed Jul. 17, 2015, which is the U.S. National Phase Application of International Patent Application No. PCT/JP2014/050836 filed Jan. 17, 2014, which claims benefit of U.S. Provisional Application No. 61/864,206 filed Aug. 9, 2013 and U.S. Provisional Application No. 61/754,106 filed on Jan. 18, 2013, the entire contents of which are incorporated herein by reference.

FIELD OF THE DISCLOSURE

The present disclosure relates to a user terminal, chipset for a user terminal, and method performed at a user terminal for interworking a cellular communication system with a wireless LAN system.

RELATED ART

In recent years, a user terminal including a cellular communication unit and a wireless LAN communication unit (so-called dual terminal) is becoming widely used. Further, the number of wireless LAN access points operated by an operator of a cellular communication system increases.

Therefore, 3GPP (3rd Generation Partnership Project), which is a project aiming to standardize a cellular communication system, plans to consider a technology capable of strengthening interworking between a cellular communication system and a wireless LAN system (see Non-patent document 1).

CITATION LIST

Non-Patent Document

[Non-patent document 1] 3GPP contribution RP-1201455

SUMMARY

When the interworking between the cellular communication system and the wireless LAN system is strengthened, it is possible to disperse a load of the cellular communication system to the wireless LAN system.

Therefore, the present disclosure provides a user terminal, a chipset for a user terminal, and a method performed at a user terminal capable of strengthening an interworking between a cellular communication system and a wireless LAN system.

A base station according to the present disclosure, which is included in a cellular radio access network (RAN), comprises a transmitter configured to transmit, to a user equipment, parameters for an offload from the cellular RAN to a wireless local area network (LAN). The parameters are used by the user equipment to perform an access network selection between the cellular RAN and the wireless LAN, and include a first threshold to be compared with a cellular signal strength of the cellular RAN, a second threshold to be compared with a wireless LAN signal strength of the wireless LAN, and a third threshold to be compared with a load of the wireless LAN.

In accordance with another exemplary aspect of the present disclosure, when the user equipment performs the access network selection, the parameters may cause the user equipment to perform the offload, in response to the cellular signal strength being lower than the first threshold, the wireless LAN signal strength being higher than the second threshold, and the load of the wireless LAN being lower than the third threshold.

A method according to the present disclosure, which is performed at a base station included in a cellular radio access network (RAN), comprises transmitting, to a user equipment, parameters for an offload from the cellular RAN to a wireless local area network (LAN). The parameters are used by the user equipment to perform an access network selection between the cellular RAN and the wireless LAN, and include a first threshold to be compared with a cellular signal strength of the cellular RAN, a second threshold to be compared with a wireless LAN signal strength of the wireless LAN, and a third threshold to be compared with a load of the wireless LAN.

DETAILED DESCRIPTION OF EMBODIMENTS

Overview of Embodiment

Figure 1:
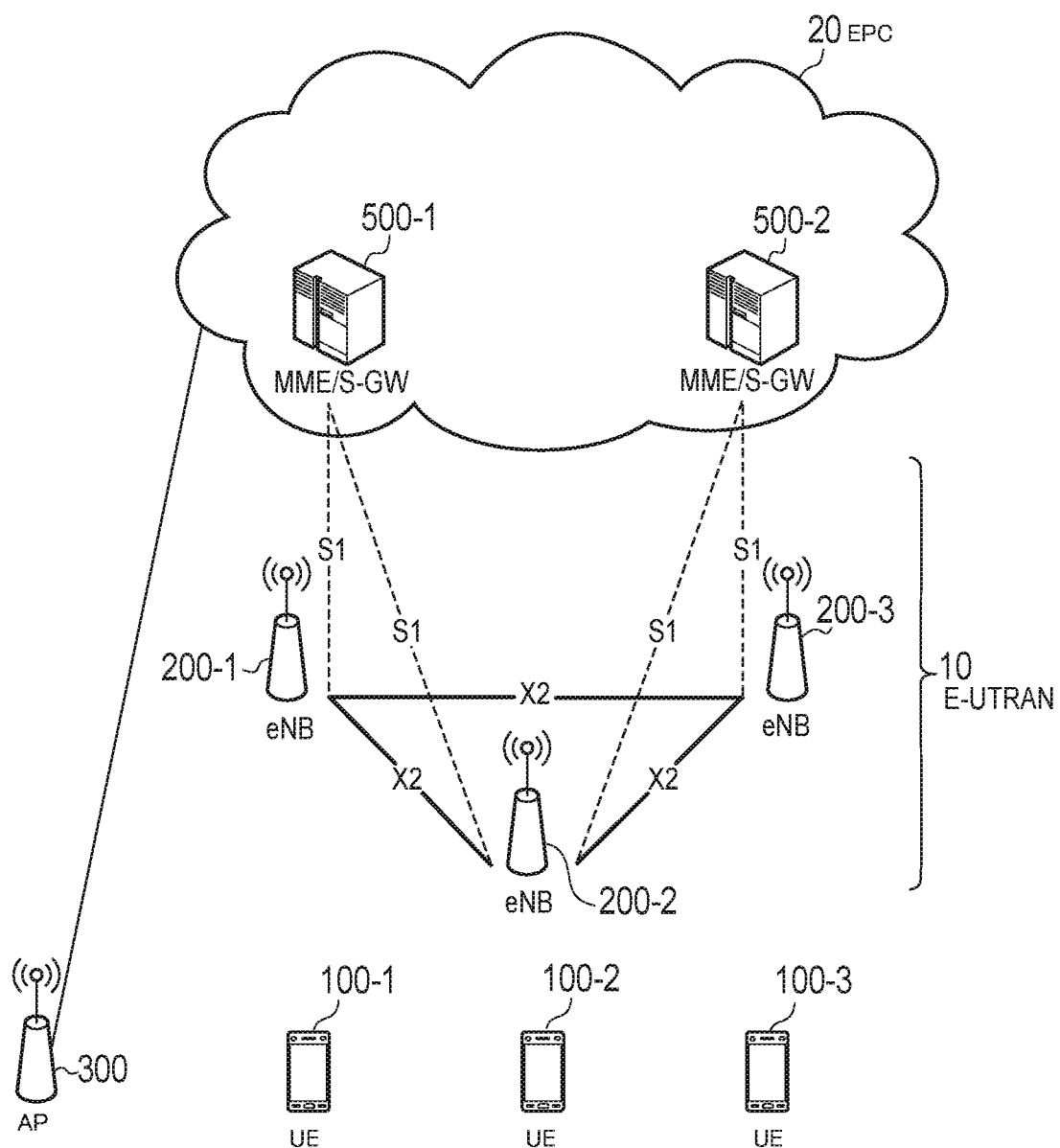
FIG. 1 is a system configuration diagram according to a first embodiment to a ninth embodiment.

A communication control method according to a first embodiment is a method for performing an offload from a cellular RAN to a wireless LAN. The communication control method includes the steps of: transmitting a list which contains identifiers of wireless LAN access points included in the wireless LAN, by a cellular base station included in the cellular RAN; receiving the list, by a user terminal which has a cellular communication unit and a wireless LAN communication unit; and performing an operation related to the offload after detecting that the user terminal approaches a wireless LAN access point on the basis of the list, by the user terminal which exists in a cell of the cellular base station. Here, "detecting approaching" means "recognition of approaching", and may mean not actually approaching (in case of misdetection). The same applies, below.

In the first embodiment, in the step of performing the operation related to the offload, the user terminal, in which the wireless LAN communication unit is in an OFF state, scans the wireless LAN access point by switching the wireless LAN communication unit to an ON state, after detecting that the user terminal approaches the wireless LAN access point on the basis of the list.

In the first embodiment, the operation comprises a scan for the wireless LAN access point. The communication control method further comprises a step of transmitting a notification indicating that the wireless LAN access point has been discovered, from the user terminal to the cellular base station, when the wireless LAN access point has been discovered by the scan.

In the first embodiment, the notification includes an identifier of the wireless LAN access point that has been discovered. The communication control method further comprises a starting up step of starting up the wireless LAN access point, by the cellular base station, when the cellular base station receives the notification and the wireless LAN access point corresponding to the identifier included in the notification is in an OFF state.

In the first embodiment, in the step of transmitting, the cellular base station transmits the list to the user terminal on the basis of a load level regarding the cellular base station.

In the first embodiment, the communication control method further includes a step of determining whether or not to use the list on the basis of status of the user terminal, by the user terminal.

In the first embodiment, the list contains identifiers of wireless LAN access points provided within a cell of the cellular base station or identifiers of wireless LAN access points provided within a tracking area including the cell.

A communication control method according to second and seventh embodiments is a method for performing an offload from a cellular RAN to a wireless LAN. The communication control method includes the steps of: transmitting information for the offload, by a cellular base station included in the cellular RAN; receiving the information from the cellular base station, by a user terminal which has a cellular communication unit and a wireless LAN communication unit and which exists in a cell of the cellular base station; performing an operation related to the offload on the basis of the information received from the cellular base station, by the user terminal.

In the second and seventh embodiments, in the step of performing the operation, the user terminal scans a wireless LAN access point by switching the wireless LAN communication unit to an ON state on the basis of the information received from the cellular base station, when the wireless LAN communication unit is in an OFF state.

In the second and seventh embodiments, in the step of transmitting, the cellular base station transmits the information to one or more user terminals when a load level of the cellular base station exceeds a threshold.

In the second and seventh embodiments, the communication control method further includes a step of transmitting a notification indicating that the wireless LAN access point has been discovered, from the user terminal to the cellular base station, when the wireless LAN access point has been discovered by the scan.

In the second and seventh embodiments, the information is information instructing to switch the wireless LAN communication unit to an ON state.

In the second and seventh embodiments, the information includes location information indicating a location of the wireless LAN access point. In the step of performing the operation, the user terminal performs the operation when detecting, on the basis of the location information, that the user terminal approaches the wireless LAN access point.

In the second and seventh embodiments, the information includes condition information indicating a condition under which to perform the operation. In the step of performing the operation, the user terminal performs the operation when detecting, on the basis of the condition information, that the condition is satisfied.

In the second and seventh embodiments, the information includes parameters to be applied to the operation.

In the second and seventh embodiments, the communication control method further includes a step of determining whether to transmit the information to the user terminal on the basis of a status of the user terminal, by the cellular base station.

A communication control method according to a third embodiment includes the steps of: broadcasting, by a specific apparatus cooperating with a cellular base station, a discovery signal for informing of presence of the specific apparatus in a cellular frequency band and in a specific period; and scanning, by a user terminal connecting to the cellular base station, the discovery signal in the cellular frequency band and in the specific period.

In the third embodiment, the specific period is designated by the cellular base station.

In the third embodiment, the specific apparatus is an apparatus that performs communication outside the cellular frequency band.

In the third embodiment, the cellular base station is a base station which performs communications at a first frequency within the cellular frequency band. The specific apparatus is an apparatus which performs communications at a second frequency within the cellular frequency band. In the step of broadcasting, the specific apparatus broadcasts the discovery signal at the first frequency within the cellular frequency band and in the specific period. In the step of scanning, the user terminal scans the discovery signal at the first frequency within the cellular frequency band and in the specific period.

In the third embodiment, the discovery signal includes an identifier of the specific apparatus.

In the third embodiment, the communication control method further includes a step of transmitting a discovery notification indicating that the discovery signal is detected, from the user terminal to the cellular base station, when the user terminal detects the discovery signal by the scan.

In the third embodiment, the communication control method further includes a step of transmitting a connection notification indicating that the user terminal is connected to the specific apparatus, from the specific apparatus to the cellular base station, when the user terminal connects to the specific apparatus after detecting the discovery signal by the scan.

In the third embodiment, the specific apparatus is a wireless LAN access point.

In the third embodiment, the specific apparatus is a cellular base station that manages a small cell.

In the third embodiment, the specific apparatus is another user terminal that supports inter-terminal radio communications.

In the third embodiment, the cellular frequency band is included in a licensed band. The specific apparatus is another cellular base station which performs communications in an unlicensed band.

A communication control method according to fourth embodiment includes the steps of: receiving a cellular reference signal broadcasted from a specific apparatus within a cellular frequency band included in a licensed band, by a user terminal connected to a cellular base station; reporting measurement information indicating a measurement result for the cellular reference signal, from the user terminal to the cellular base station; and transmitting information for scanning the specific apparatus to the user terminal, on the basis of the measurement information reported from the user terminal, by the cellular base station. The specific apparatus is an apparatus which performs communications in an unlicensed band.

In the fourth embodiment, a cell identifier for identifying the specific apparatus is assigned to the specific apparatus. The cellular reference signal transmitted by the specific apparatus includes the cell identifier.

A communication control method according to a fifth embodiment includes the steps of: detecting a cellular uplink signal transmitted by a user terminal connected to a cellular base station, by a specific apparatus; transmitting a notification indicating that the user terminal approaches the specific apparatus on the basis of the detection of the cellular uplink signal, from the specific apparatus to the cellular base station; and transmitting information for scanning the specific apparatus on the basis of the notification from the specific apparatus, from the cellular base station to the user terminal.

In the fifth embodiment, the communication control method further includes a step of determining whether or not the user terminal approaches the specific apparatus, by the specific apparatus. The step of determining comprises the steps of: acquiring signal information on a cellular uplink signal transmitted by the user terminal, from the cellular base station, estimating a pathloss between the user terminal and the specific apparatus on the basis of the signal information; and determining that the user terminal approaches the specific apparatus when the pathloss is less than a threshold.

In the fifth embodiment, the communication control method further includes a step of determining, by the specific apparatus, whether or not the user terminal approaches the specific apparatus on the basis of a distance between the specific apparatus and the cellular base station and a received power of the cellular uplink signal.

A communication control method according to a sixth embodiment includes: a deriving step of deriving a moving velocity of a user terminal having a cellular communication unit and a wireless LAN communication unit and being connected to a cellular base station, by the user terminal; and a suspension step of suspending a scan for the wireless LAN access point when the moving velocity exceeds a threshold even if the wireless LAN communication unit is in an ON state, by the user terminal.

A communication control method according to an eighth embodiment includes the steps of: transmitting notification information indicating a switch from a specific apparatus to a cellular base station, from a user terminal to the cellular base station, when the user terminal switches a connection target from the specific apparatus to the cellular base station; and transmitting, from the cellular base station to the specific apparatus, request information requesting to transfer transmission data addressed to the user terminal to the cellular base station on the basis of the notification information. The specific apparatus is an apparatus which performs communications in an unlicensed band.

In the eighth embodiment, the notification information includes an identifier for identifying the specific apparatus.

In the eighth embodiment, the notification information includes an identifier for identifying the user terminal.

A communication control method according to a ninth embodiment includes the steps of: deciding, by a specific apparatus arranged within a coverage of a cellular base station, to switch a connection target of a user terminal from the specific apparatus to the cellular base station, without receiving a measurement report about the cellular base station from the user terminal; transmitting, from the specific apparatus to the cellular base station, request information requesting a switch to the cellular base station; and transmitting, from the specific apparatus to the user terminal, instruction information for instructing a switch to the cellular base station when the specific apparatus receives, from the cellular base station, a response for the request information. The specific apparatus is an apparatus which performs communications in an unlicensed band.

Below, with reference to the drawing, each embodiment will be described in which an LTE system that is a cellular communication system configured in compliance with the 3GPP standards is interworked with a wireless LAN (WLAN) system.

First Embodiment (System Configuration According to First Embodiment)

FIG. 1 is a system configuration diagram according to a first embodiment. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. E-UTRAN 10 corresponds to a radio access network. The EPC 20 corresponds to a core network.

The UE 100 is a mobile radio communication device and performs radio communication with a cell with which a connection is established. The UE 100 corresponds to the user terminal. The UE 100 is a terminal (dual terminal) that supports both cellular communication and WLAN communication.

The E-UTRAN 10 includes a plurality of eNBs 200 (evolved Node-Bs). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200, for example, has a radio resource management (RRM) function, a routing function of user data, and a measurement control function for mobility control and scheduling.

The eNBs 200 are connected mutually via an X2 interface. Further, the eNB 200 is connected to MME/S-GW 500 included in the EPC 20 via an S1 interface.

The EPC 20 includes a plurality of MMEs (Mobility Management Entity)/S-GWs (Serving-Gateways) 500. The MME is a network node for performing various mobility controls, for example, for the UE 100 and corresponds to a controller. The S-GW is a network node that performs transfer control of user data and corresponds to a mobile switching center.

The WLAN system includes WLAN AP (hereinafter, "AP") 300. The WLAN system is configured to be in compliance with various IEEE 802.11 specifications, for example. The AP 300 communicates with the UE 100 in a frequency band (WLAN frequency band) different from a cellular frequency band. The AP 300 is connected to the EPC 20 via a router, etc. In the first embodiment, the AP 300 is operated by an operator of a cellular communication system (LTE system). Note that the cellular frequency band is included in a licensed band (frequency band for which a license is required). On the other hand, the WLAN frequency band is included in an unlicensed band (frequency band for which a license is not required).

Subsequently, configurations of the UE 100, the eNB 200, and the AP 300 will be described.

Figure 2:
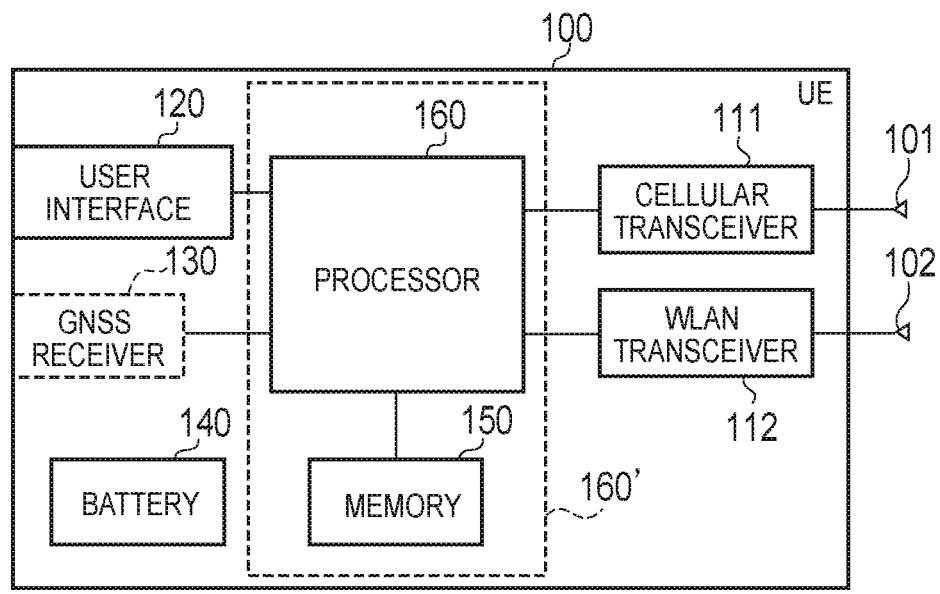
FIG. 2 is a block diagram of UE (user terminal) according to the first embodiment to the ninth embodiment.

FIG. 2 is a block diagram of the UE 100. As shown in FIG. 2, the UE 100 includes: antennas 101 and 102; a cellular transceiver (cellular communication unit) 111; a WLAN transceiver (WLAN communication unit) 112; a user interface 120; a GNSS (Global Navigation Satellite System) receiver 130; a battery 140; a memory 150; and a processor 160. The memory 150 and the processor 160 configure a control unit. The UE 100 may not have the GNSS receiver 130. Furthermore, the memory 150 may be integrally formed with the processor 160, and this set (that is, a chipset) may be called a processor 160'.

The antenna 101 and the cellular transceiver 111 are used for transmitting and receiving a cellular radio signal. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used for transmitting and receiving a WLAN radio signal. The WLAN transceiver 112 converts the baseband signal output from the processor 160 into a WLAN radio signal, and transmits the same from the antenna 102. Further, the WLAN transceiver 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, and encoding and decoding of the baseband signal and a CPU that performs various processes by executing the program stored in the memory 150. The processor 160 may further include a codec that performs encoding and decoding of sound and video signals. The processor 160 implements various processes and various communication protocols described later.

Figure 3:
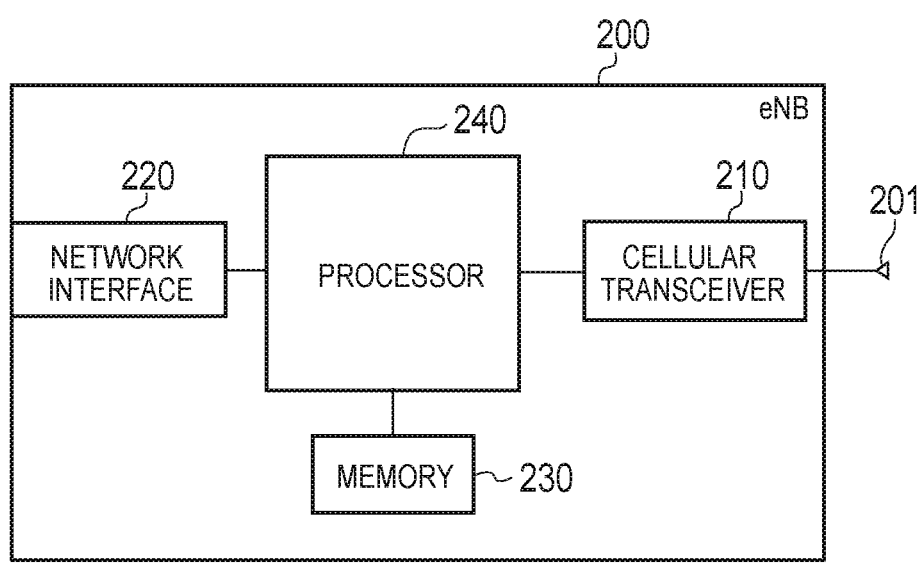
FIG. 3 is a block diagram of eNB (cellular base station) according to the first embodiment to the ninth embodiment.

FIG. 3 is a block diagram of the eNB 200. As shown in FIG. 3, the eNB 200 includes an antenna 201, a cellular transceiver 210, a network interface 220, a memory 230, and a processor 240. The memory 230 and the processor 240 configure a control unit. Furthermore, the memory 230 may be integrally formed with the processor 240, and this set (that is, a chipset) may be called a processor 240'.

The antenna 201 and the cellular transceiver 210 are used for transmitting and receiving a cellular radio signal. The cellular transceiver 210 converts the baseband signal output from the processor 240 into the cellular radio signal, and transmits the same from the antenna 201. Furthermore, the cellular transceiver 210 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
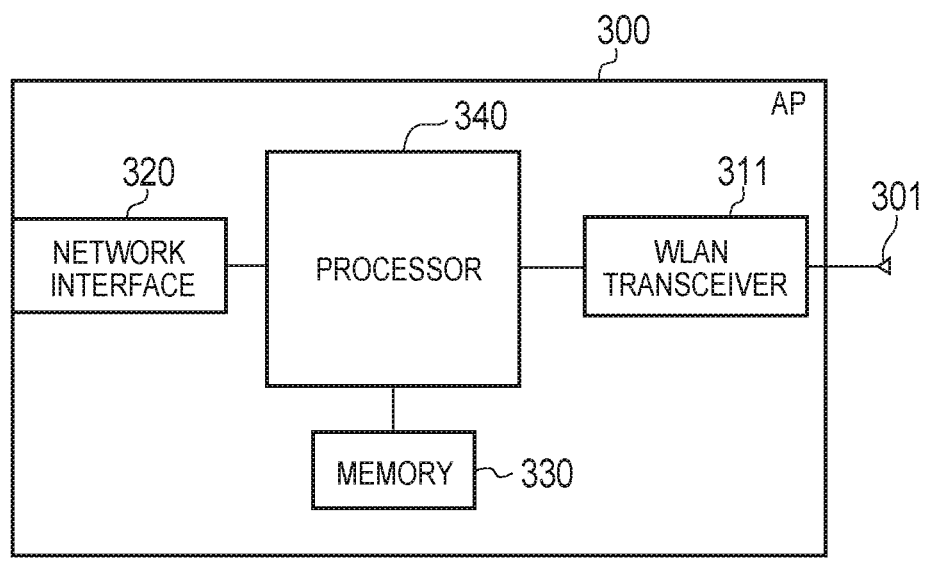
FIG. 4 is a block diagram of AP (wireless LAN access point) according to the first embodiment and the second embodiment and the sixth embodiment to the ninth embodiment.

FIG. 4 is a block diagram of the AP 300. As shown in FIG. 4, the AP 300 includes an antenna 301, a WLAN transceiver 311, a network interface 320, a memory 330, and a processor 340. Furthermore, the memory 330 may be integrally formed with the processor 340, and this set (that is, a chipset) may be called a processor 340'.

The antenna 301 and the WLAN transceiver 311 are used for transmitting and receiving the WLAN radio signal. The WLAN transceiver 311 converts the baseband signal output from the processor 340 into the WLAN radio signal and transmits the same from the antenna 301. Further, the WLAN transceiver 311 converts the WLAN radio signal received by the antenna 301 into the baseband signal and outputs the same to the processor 340.

The network interface 320 is connected to the EPC 20 via a router, etc. Further, the network interface 320 is used for communication with the eNB 200 via the EPC 20.

The memory 330 stores a program executed by the processor 340 and information used for a process by the processor 340. The processor 340 includes the baseband processor that performs modulation and demodulation, and encoding and decoding of the baseband signal and a CPU that performs various processes by executing the program stored in the memory 330.

Figure 5:
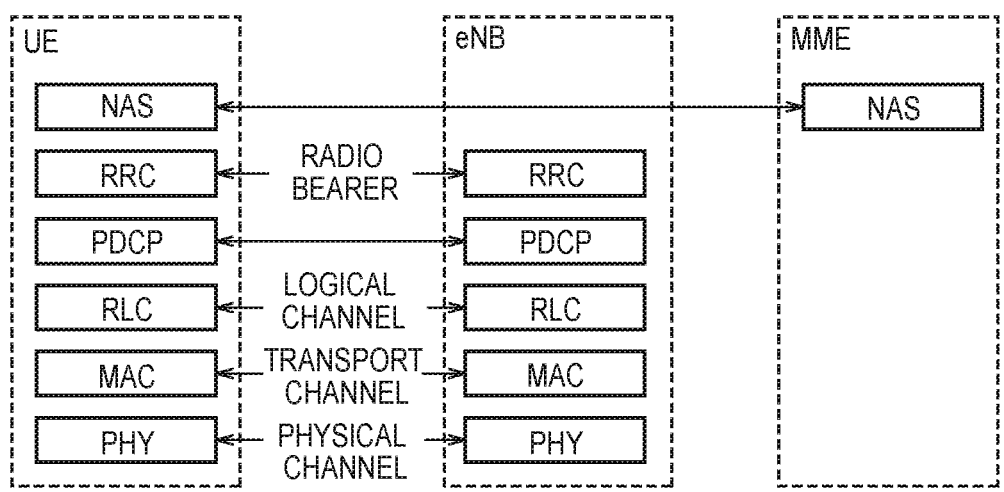
FIG. 5 is a protocol stack diagram of a radio interface in the LTE system.

FIG. 5 is a protocol stack diagram of a radio interface in the LTE system. As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for deciding a transport format (a transport block size, a modulation and coding scheme, and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), and otherwise, the UE 100 is in an idle state (RRC idle state).

A NAS (Non-Access Stratum) layer positioned above the RRC layer performs session management or mobility management, for example.

Figure 6:
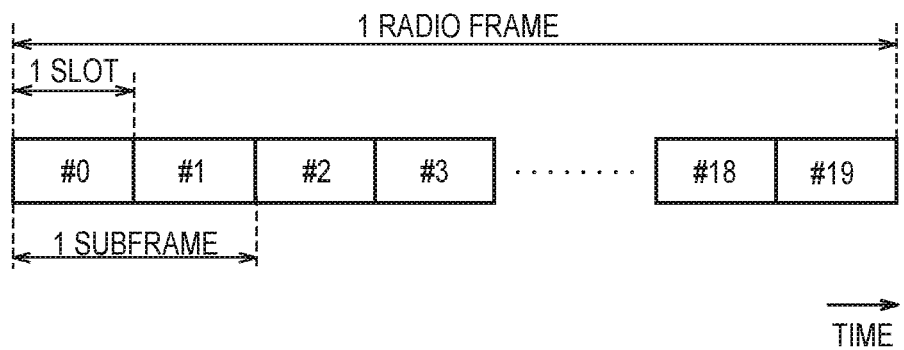
FIG. 6 is a configuration diagram of a radio frame used in the LTE system.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction.

Among radio resources assigned to the UE 100, a frequency resource can be designated by a resource block and a time resource can be specified by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Furthermore, in the downlink, reference signals such as cell-specific reference signals are dispersed and arranged in each subframe.

In the uplink, both ends, in the frequency direction, of each subframe are control regions mainly used as a physical uplink control channel (PUCCH). Furthermore, the center portion, in the frequency direction, of each subframe is a region mainly used as a physical uplink shared channel (PUSCH).

(Operation According to First Embodiment)

Figure 7:
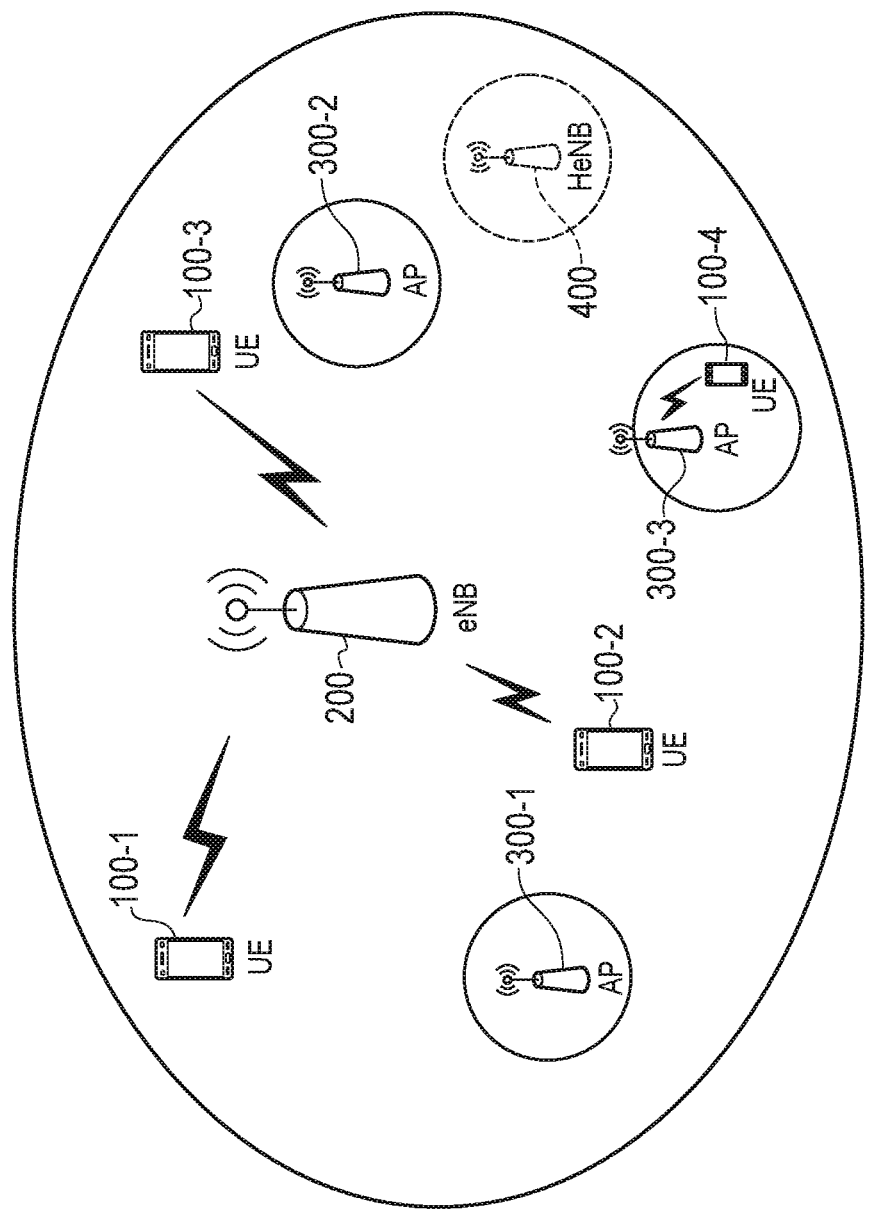
FIG. 7 is a diagram for illustrating an operation environment according to the first embodiment to the ninth embodiment.

Subsequently, an operation according to the first embodiment will be described. FIG. 7 is a diagram for illustrating an operation environment according to the first embodiment.

As shown in FIG. 7, the AP 300 (an AP 300-1 to an AP 300-3) is arranged within a coverage of the eNB 200. In the first embodiment, the eNB 200 manages a cell over a wide range (large cell). The large cell is a general cell in the LTE system, and is called "macro cell".

Further, it may be possible that within the coverage of the macro cell, a small cell having a narrower coverage than the macro cell is arranged. The small cell is called "pico cell" or "femto cell". The small cell belongs to a frequency that is within a cellular frequency band and that is different from a frequency to which the macro cell belongs. The small cell is managed by HeNB 400 (pico eNB or femto eNB).

UE 100-1 to UE 100-3 are connected to a cell (macro cell) of the eNB 200, and perform cellular communication with the eNB 200. When the eNB 200 houses a large number of UEs 100, a load level of the eNB 200 increases. That is, an amount of a radio resource (a resource block, etc.) that can be assigned by the eNB 200 to each UE 100 decreases.

The AP 300 is operated by an operator of a cellular communication system (in the present embodiment, the LTE system). Such AP 300 is called "Planned AP". UE 100-4 is connected to the AP 300-3, and performs WLAN communication with the AP 300-3. On the other hand, there is no UE 100 to be connected to the AP 300-1 and the AP 300-2.

Subsequently, an overview of an operation according to the first embodiment will be described. In the first embodiment, a load of the eNB 200 is dispersed (offloaded) to the AP 300.

Firstly, the UE 100 stores a list on the APs 300 (Planned APs) to which the UE 100 is connectable (hereinafter, "AP white list"). The AP white list includes identifiers of the APs 300 to which the UE 100 is connectable. The AP white list may include AP location information on a peripheral location of the AP 300. Alternatively, the AP white list may further include an identifier (cell identifier) of eNB 200. The identifier of the AP 300 is SSID (Service Set Identifier) or ESSID (Extended Service Set Identifier), for example.

The UE 100 may autonomously update the AP white list and the eNB 200 sets the AP white list to the UE 100, and the both cases may be combined. In a case where the UE 100 autonomously updates the AP white list, when the UE 100 is connected to the AP 300 after which there is a notification that the AP 300 is the Planned AP from the AP 300, the AP white list is updated. On the other hand, in a case where the eNB 200 sets the AP white list to the UE 100, the UE 100 receives and stores, from the eNB 200, the AP white list on each AP 300 arranged within the coverage of the eNB 200. In this case, the AP white list may be managed in a unit of eNB 200 (or a unit of cell), or in a unit of tracking area.

The eNB 200 may determine whether to transmit the AP white list to the UE 100 before transmitting the AP white list to the UE 100. For example, the eNB 200 does not transmit the AP white list to the UE 100 when it is assumed that the UE 100 will be out of coverage of the eNB 200 by estimating that the UE 100 is moving at high speed based on the number of handovers per a time unit or location information and the like. Alternatively, such determination may be performed by the UE 100. Specifically, the UE 100 storing the AP white list does not use the AP white list when it is assumed that the UE 100 will be out of coverage of the eNB 200 by estimating that the UE 100 is moving at high speed based on the number of handovers per a time unit or location information and the like.

The eNB 200 may adjust the number of Aps 300 included in the AP white list before transmitting the AP white list to the UE 100. For example, the eNB 200 decreases the number of Aps 300 included in the AP white list by limiting geographical range of APs 300 to be included in the AP white list when the eNB 200 determines that the moving velocity of UE 100 is low by estimating the moving velocity of UE 100 based on the number of handovers per a time unit or location information and the like. Alternatively, such adjustment may be performed by the UE 100. Specifically, the UE 100 storing the AP white list decreases the number of APs 300 to be targeted among APs 300 included in the AP white list, when the UE 100 determines that the moving velocity of UE 100 is low by estimating the moving velocity of UE 100 based on the number of handovers per a time unit or location information and the like.

The UE 100 may determine whether to use the AP white list, by considering one of a traffic amount and a traffic type exchanged by the UE 100, or radio communication environment of the UE 100. For example, the UE 100 uses the AP white list, when the traffic amount exchanged by the UE 100 is heavy or when the QoS of traffic exchanged by the UE 100 is low. Otherwise, the UE 100 does not use the AP white list.

The eNB 200 may set the AP white list to the UE 100 without including AP information in the AP white list when the offload is unnecessary.

Secondly, the UE 100 detects the UE 100 having approached the AP 300, on the basis of the AP white list, when the UE 100 is connected to the eNB 200 and the WLAN transceiver 112 is in an OFF state. The UE 100 is capable of detecting the UE 100 approaching the AP 300, for example, by comparing the UE location information grasped by the GNSS receiver 130 or the UE location information obtained from a network, with the AP location information. Here, as described above, "detecting approaching" means "recognition of approaching", and may mean not actually approaching (may mean erroneous detection). Alternatively, in a case where cell identifiers are included in the AP white list, the UE 100 may detect the UE 100 approaching the AP 300 by comparing a cell identifier of connection destination with the cell identifiers included in the AP white list.

Thirdly, the UE 100 detects the UE 100 having approached the AP 300, and then, switches the WLAN transceiver 112 to an ON state after which the UE 100 performs a WLAN scanning. Specifically, the UE 100 confirms whether it is possible to receive a WLAN signal (beacon signal) from the AP 300. The UE 100 may perform a WLAN scanning on the beacon signal including the identifier (SSID/ESSID) of the AP 300 that was detected, by the UE 100, being approached, on the basis of the AP white list.

Therefore, the UE 100 that is approaching the AP 300 is capable of discovering the AP 300. As a result, it is possible for the UE 100 to be connected to the AP 300, and thus, it is possible to efficiently use the AP 300 and disperse (offload) the load of the eNB 200 to the AP 300.

Figure 8:
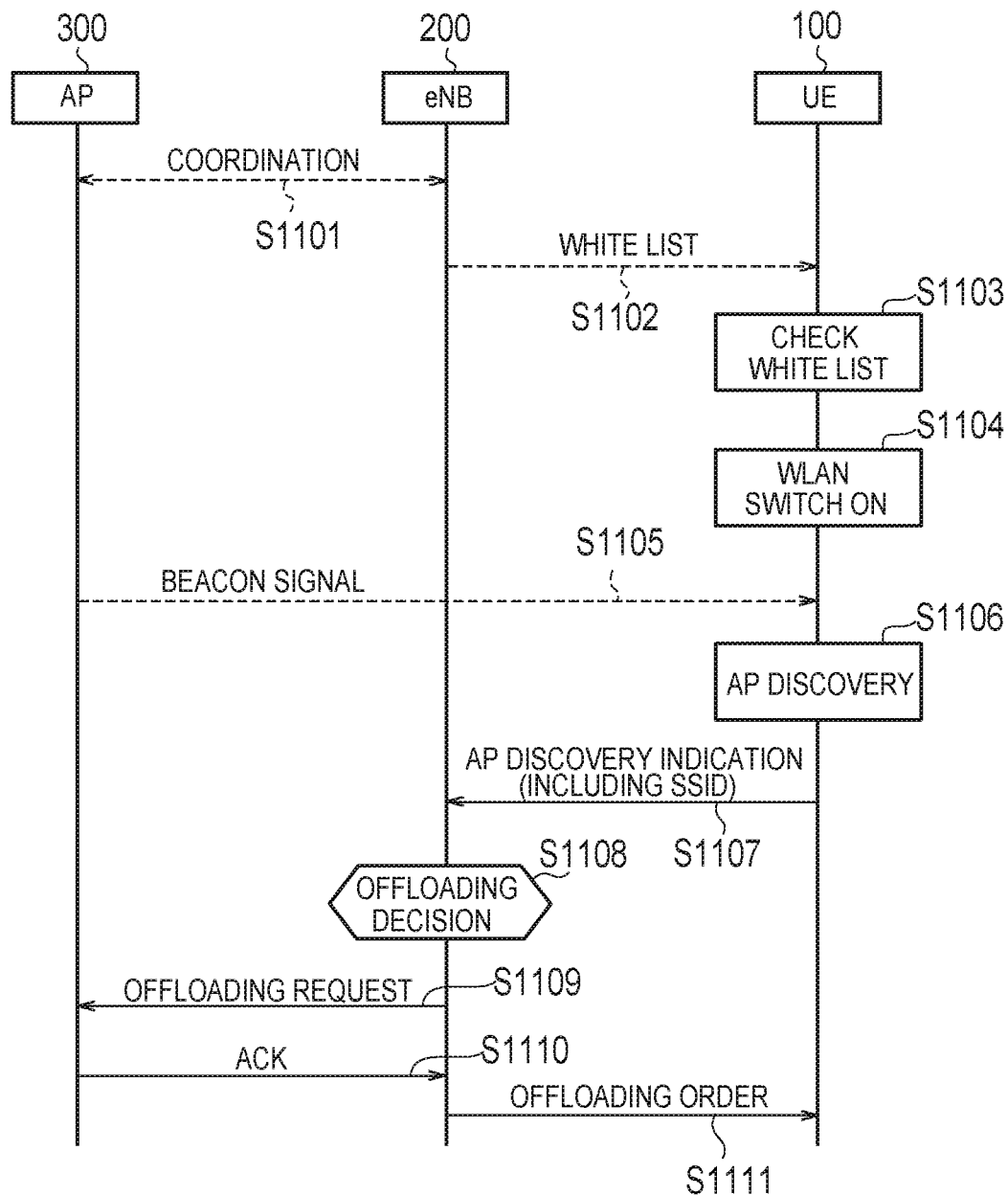
FIG. 8 is a sequence diagram of an operation pattern 1 according to the first embodiment.

Subsequently, a specific example of an operation according to the first embodiment will be described. FIG. 8 is sequence diagram of an operation pattern 1 according to the first embodiment. In an initial state of FIG. 8, the UE 100 is connected to the eNB 200 and sets so that the WLAN transceiver 112 is in an OFF state. Further, the eNB 200 and the AP 300 perform a negotiation for operating in interworking with each other (step S1101).

As shown in FIG. 8, in step S1102, the eNB 200 transmits the AP white list to the UE 100. For example, the AP white list is transmitted by using an RRC message. The UE 100 stores the AP white list received from the eNB 200. In a case where the UE 100 autonomously updates the AP white list, the step S1102 may be unnecessary.

In step S1103, the UE 100 determines whether or not the UE 100 approaches the AP 300 on the basis of the AP white list. In this case, description is provided on the assumption that the UE 100 has approached the AP 300.

In step S1104, the UE 100 switches the WLAN transceiver 112 to the ON state, and starts a WLAN scanning.

In step S1105, the UE 100 receives the beacon signal from the AP 300.

In step S1106, the UE 100 discovers the AP 300 on the basis of the beacon signal received from the AP 300. Further, the UE 100 extracts an identifier (SSID/ESSID) included in the beacon signal received from the AP 300.

In step S1107, the UE 100 transmits a discovery notification indicating that the AP 300 was discovered (AP discovery indication), to the eNB 200. The AP discovery indication includes the identifier (SSID/ESSID) of the discovered AP 300.

In step S1108, the eNB 200 determines whether or not the UE 100 is made to be connected to the AP 300 (that is, whether to perform the offload) on the basis of the AP discovery indication received from the UE 100. The eNB 200 may perform such a determination in consideration of the load level of the eNB 200 and an amount or a category of the traffic, for example, that the UE 100 transmits and receives. For example, the eNB 200 determines that the UE 100 is made to be connected to the AP 300, when the load level of the eNB 200 is high. Further, the eNB 200 determines that the UE 100 is made to be connected to the AP 300, when a traffic amount that the UE 100 transmits and receives is large, or when QoS of a traffic that the UE 100 transmits and receives is small. In this case, description is provided on the assumption that the eNB 200 determines that the UE 100 is made to be connected to the AP 300.

In step S1109, the eNB 200 transmits request information requesting a connection by the UE 100 to the AP 300, to the AP 300.

In step S1110, the AP 300 transmits a response (Ack) to the request information transmitted from the eNB 200, to the eNB 200.

In step S1111, the eNB 200 transmits a connection instruction to instruct a connection to the AP 300, to the UE 100, in response to receiving the response (Ack) from the AP 300. The connection instruction may include information designating a category of the traffic that the UE 100 should transmit to and receive from the AP 300.

The UE 100 connects to the AP 300 when receiving the connection instruction from the eNB 200, and starts WLAN communication with the AP 300. When the connection instruction includes the information designating the traffic type, the UE 100 transmits and receives the designated traffic type by the WLAN communication.

The UE 100 may notify the eNB 200 of the completion of the connection when the connection with the AP 300 is completed. Alternatively, the AP 300 may notify the eNB 200 of the connection by the UE 100.

On the other hand, when the connection instruction from the eNB 200 is not received until a predetermined timer time elapses since the UE 100 transmitted the AP discovery indication to the eNB 200, the UE 100 may determine a time-out and switch the WLAN transceiver 112 to an OFF state. Alternatively, when a connection suspension instruction instructing not to connect to the AP 300 is transmitted from the eNB 200 to the UE 100 and the UE 100 receives the connection suspension instruction, the WLAN transceiver 112 may be switched to an OFF state.

Figure 9:
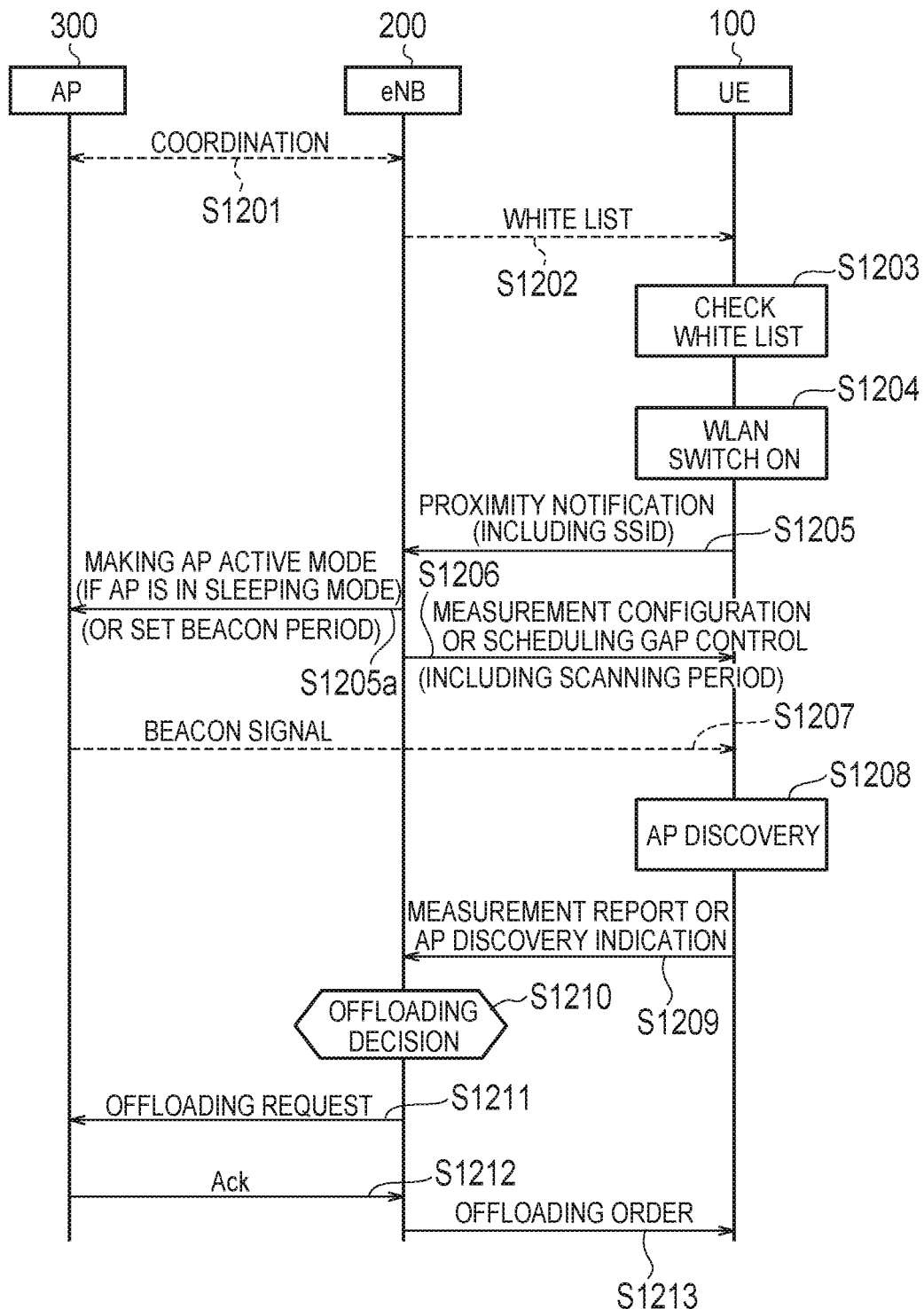
FIG. 9 is a sequence diagram of an operation pattern 2 according to the first embodiment.

FIG. 9 is a sequence diagram of an operation pattern 2 according to the first embodiment. In this case, a difference from the operation pattern 1 will be mainly described.

As shown in FIG. 9, steps S1201 to S1204 are the same as those in the operation pattern 1. However, in the operation pattern 2, in step S1201, the eNB 200 may grasp whether or not the AP 300 is in an OFF state (sleep state).

After the UE 100 detects the UE 100 approaching the AP 300 (step S1203) and the WLAN transceiver 112 is switched to an ON state (step S1204), in step S1205, the UE 100 transmits a proximity notification indicating that the UE 100 approaches the AP 300, to the eNB 200. The proximity notification includes the identifier (SSID/ESSID) of the AP 300 that was detected, by the UE 100, approaching. It is noted that step S1204 may be performed after step S1205 or after step S1206. An AP discovery notification (measurement report) may be used instead of the proximity notification.

In step S1205a, when the AP 300 corresponding to the identifier (SSID/ESSID) included in the proximity notification from the UE 100 is in an OFF state, the eNB 200 starts up the AP 300. The eNB 200 may transmit, to the AP 300, a setting request requesting to set to shorten a transmission cycle of the beacon signal in a constant period, when the AP 300 is in an ON state.

In step S1206, the eNB 200 transmits, to the UE 100, a scanning instruction instructing the WLAN scanning. The scanning instruction includes information on designating a timing, a frequency, etc., at which the WLAN scanning should be performed. The timing at which the WLAN scanning should be performed preferably is set to a timing at which the AP 300 broadcasts the beacon signal. Such a broadcast timing may be expressed in an offset on the basis of the timing of the eNB 200. The UE 100 performs the WLAN scanning in accordance with the timing, the frequency, etc., set by the scanning instruction received from the eNB 200.

It is noted that the eNB 200 may set again a measurement cycle of the cellular communication to the UE 100 in consideration of the timing at which the AP 300 broadcasts the beacon signal. Such a setting preferably is set to a timing at which the cellular communication is not measured at the timing of the WLAN scanning.

In step S1207, the UE 100 receives the beacon signal from the AP 300.

In step S1208, the UE 100 discovers the AP 300 on the basis of the beacon signal received from the AP 300. Further, the UE 100 extracts an identifier (SSID/ESSID) included in the beacon signal received from the AP 300.

In step S1209, the UE 100 transmits the discovery notification (AP discovery indication) showing that the AP 300 was discovered, to the eNB 200. The AP discovery indication includes the identifier (SSID/ESSID) of the discovered AP 300. The AP discovery indication may include measurement information (received power, etc.) on the beacon signal from the AP 300.

The subsequent operations are the same as those in the operation pattern 1. However, the eNB 200 may request the AP 300 to restore the transmission cycle of the beacon signal to the original state, when the AP 300 is requested to set to shorten the transmission cycle of the beacon signal in a constant period and the constant period does not expire at a time point at which it is notified, by the UE 100, the effect that the UE 100 is connected to the AP 300.

Second Embodiment

For a second embodiment, a difference from the above-described first embodiment will be mainly described. A system configuration and an operation environment according to the second embodiment are the same as those in the first embodiment. However, the second embodiment differs from the first embodiment in that the former is led by the eNB 200.

Firstly, an overview of an operation according to the second embodiment will be described. In the second embodiment, the eNB 200 transmits, to one or a plurality of UEs 100 connected to the eNB 200, trigger information for scanning the AP 300. The eNB 200 may transmit the trigger information when the load level of the eNB 200 is high (exceeds a threshold).

In an operation pattern 1 according to the second embodiment, the trigger information is information instructing to switch the WLAN transceiver 112 to an ON state. The eNB 200 transmits the trigger information to the selected UE 100. The UE 100 switches the WLAN transceiver 112 to an ON state and performs the WLAN scanning, when the UE 100 receives the trigger information.

In an operation pattern 2 according to the second embodiment, the trigger information includes the AP location information indicating a location of the AP 300. The eNB 200 transmits the trigger information to the selected UE 100. The UE 100 switches the WLAN transceiver 112 to an ON state and performs the WLAN scanning, when the UE 100 receives the trigger information and detects the UE 100 having approached the AP 300 on the basis of the AP location information.

In an operation pattern 3 according to the second embodiment, the trigger information includes condition information indicating a condition under which to perform a scan. The eNB 200 transmits the trigger information by broadcast. The UE 100 switches the WLAN transceiver 112 to an ON state and performs the WLAN scanning, when the UE 100 receives the trigger information and detects that a condition under which to perform the WLAN scanning is satisfied, on the basis of the condition information.

In another operation pattern according to the second embodiment, the trigger information may be an offload preference indicator. Alternatively, network selection parameters may be used in addition to the trigger information or instead of the trigger information. Other operation patterns will be described in the seventh embodiment and the additional statements.

Figure 10:
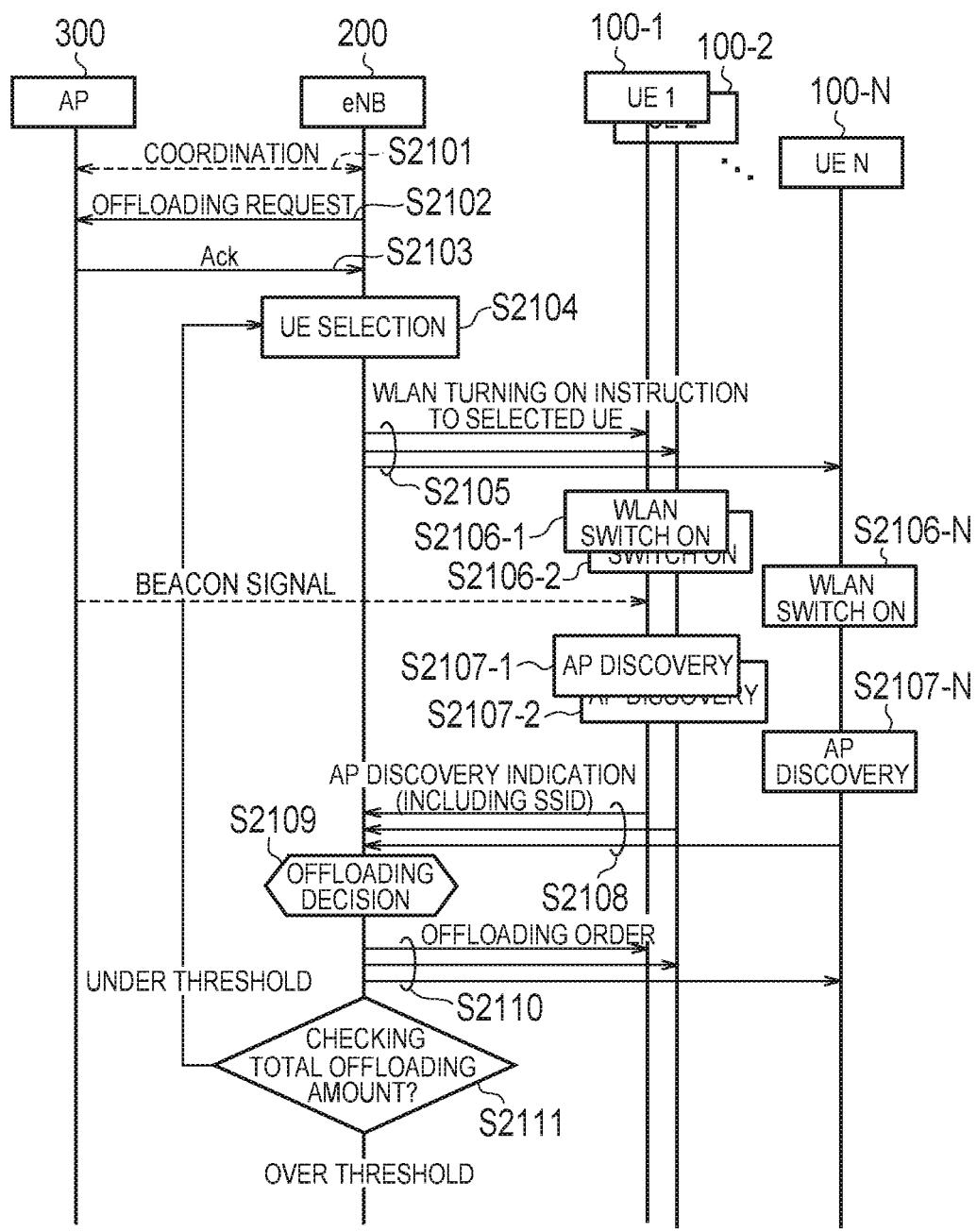
FIG. 10 is a sequence diagram of an operation pattern 1 according to the second embodiment.

Subsequently, a specific example of an operation according to the second embodiment will be described. FIG. 10 is a sequence diagram of the operation pattern 1 according to the second embodiment. In an initial state of FIG. 10, the UE 100 (UE 100-1 to UE 100-N) is connected to the eNB 200 and sets so that the WLAN transceiver 112 is in an OFF state. Further, the eNB 200 and the AP 300 perform a negotiation for operating in interworking with each other (step S2101).

As shown in FIG. 10, in step S2102, the eNB 200 transmits the request information requesting a connection by the UE 100 to the AP 300, to the AP 300.

In step S2103, the AP 300 transmits, to the eNB 200, a response (Ack) to the request information transmitted from the eNB 200. The eNB 200 stores the identifier (SSID/ESSID) of the AP 300 from which the response (Ack) is obtained.

In step S2104, the eNB 200 selects the UE 100 to which the trigger information is to be transmitted. The eNB 200 may make such a determination in consideration of an amount or a category of the traffic that the UE 100 transmits and receives, a radio communication environment of the UE 100, etc. For example, the eNB 200 selects the UE 100 as a target to which the trigger information is transmitted, when a traffic amount that the UE 100 transmits and receives is large or QoS of a traffic that the UE 100 transmits and receives is small. Alternatively, the eNB 200 may estimate a distance between the UE 100 and the eNB 200 on the basis of a pathloss or a timing advance, for example, and select a remote UE 100 as a target to which the trigger information is transmitted. Alternatively, the eNB 200 may determine whether or not the UE 100 is at a cell edge on the basis of radio quality information between the eNB 200 and the UE 100, and select the UE 100 determined to be at the cell edge as a target to which the trigger information is transmitted.

It is noted that the eNB 200 may inquire each UE 100 of the presence or absence of a WLAN support, prior to step S2104. Alternatively, the eNB 200 may previously grasp whether the UE 100 provides the WLAN support, as Capability information of the UE 100. In this case, the Capability information notified from the UE 100 to the eNB 200 includes information on whether the UE 100 provides the WLAN support. The eNB 200 excludes UE 100 that does not support the WLAN, from a selection target.

In step S2105, the eNB 200 transmits, as the trigger information, information (WLAN turning on instruction) instructing the selected UE 100 to switch the WLAN transceiver 112 to an ON state.

In step S2106, the UE 100 that received the trigger information (WLAN turning on instruction) switches the WLAN transceiver 112 to an ON state, and performs a scanning. It is noted that when the UE 100 that does not support the WLAN receives the trigger information, the trigger information may be ignored and the eNB 200 may be notified to that effect.

In step S2107, the UE 100 discovers the AP 300 on the basis of the beacon signal received from the AP 300. Further, the UE 100 extracts an identifier (SSID/ESSID) included in the beacon signal received from the AP 300.

In step S2108, the UE 100 transmits an AP discovery indication indicating that the AP 300 was discovered, to the eNB 200. The AP discovery indication includes the identifier (SSID/ESSID) of the discovered AP 300.

In step S2109, the eNB 200 determines whether or not the UE 100 is made to be connected to the AP 300 (that is, whether or not to perform an offload), on the basis of the AP discovery indication received from the UE 100. The determination method is the same as that in the first embodiment. However, in the second embodiment, the eNB 200 determines that the UE 100 that discovers the AP 300 from which the response (Ack) is not obtained should not be connected to the AP 300.

In step S2110, the eNB 200 transmits a connection instruction instructing a connection to the AP 300, to the UE 100 that is determined to be connected to the AP 300. The connection instruction may include information designating a category of the traffic that the UE 100 should transmit to and receive from the AP 300.

The UE 100 connects to the AP 300 when receiving the connection instruction from the eNB 200, and starts WLAN communication with the AP 300. Further, when connection instruction includes information designating the traffic type, the designated traffic type is transmitted and received by the WLAN communication.

In step S2111, the eNB 200 determines whether or not the load level dispersed (offloaded) to the AP 300 exceeds a threshold (that is, whether or not the load level of the eNB 200 decreases to a target value). When the offloaded load level is less than the threshold, the process returns to step S2104.

Figure 11:
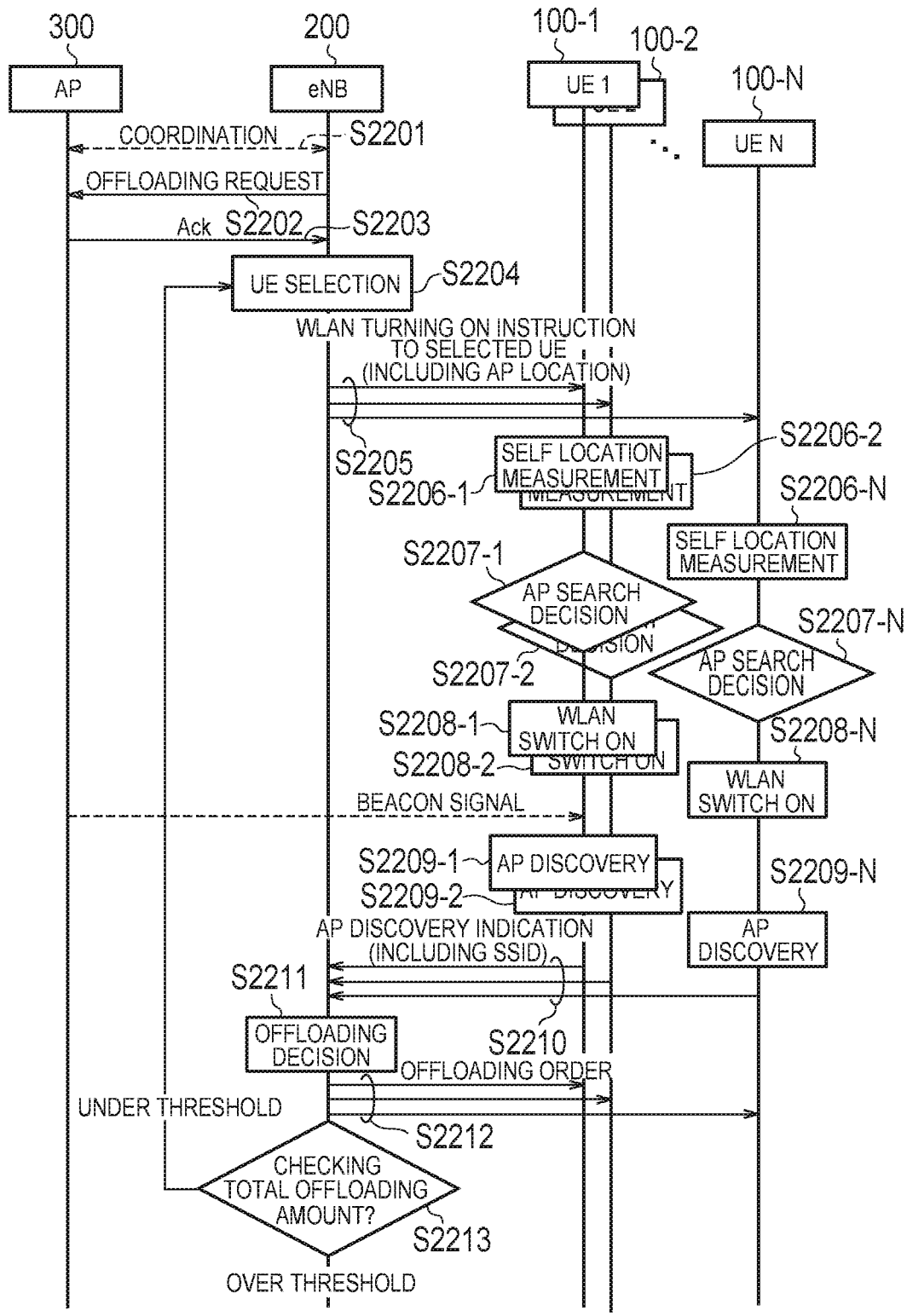
FIG. 11 is a sequence diagram of an operation pattern 2 according to the second embodiment.

FIG. 11 is a sequence diagram of the operation pattern 2 according to the second embodiment. In this case, a difference from the operation pattern 1 will be mainly described.

As shown in FIG. 11, steps S2201 to S2204 are the same as those in the operation pattern 1.

In step S2205, the eNB 200 transmits, as the trigger information, information instructing the selected UE 100 to switch the WLAN transceiver 112 to an ON state (WLAN turning on instruction). The trigger information includes AP location information.

In steps S2206 and S2207, the UE 100 that received the trigger information (WLAN turning on instruction) determines whether or not the UE 100 approaches the AP 300 on the basis of the AP location information and the UE location information included in the WLAN turning on instruction. Such a determination method is the same as that in the first embodiment.

The UE 100 that determined to approach the AP 300 switches the WLAN transceiver 112 to an ON state and performs the WLAN scanning, in step S2208. The subsequent operations (steps S2209 to S2213) are the same as those in the operation pattern 1.

Figure 12:
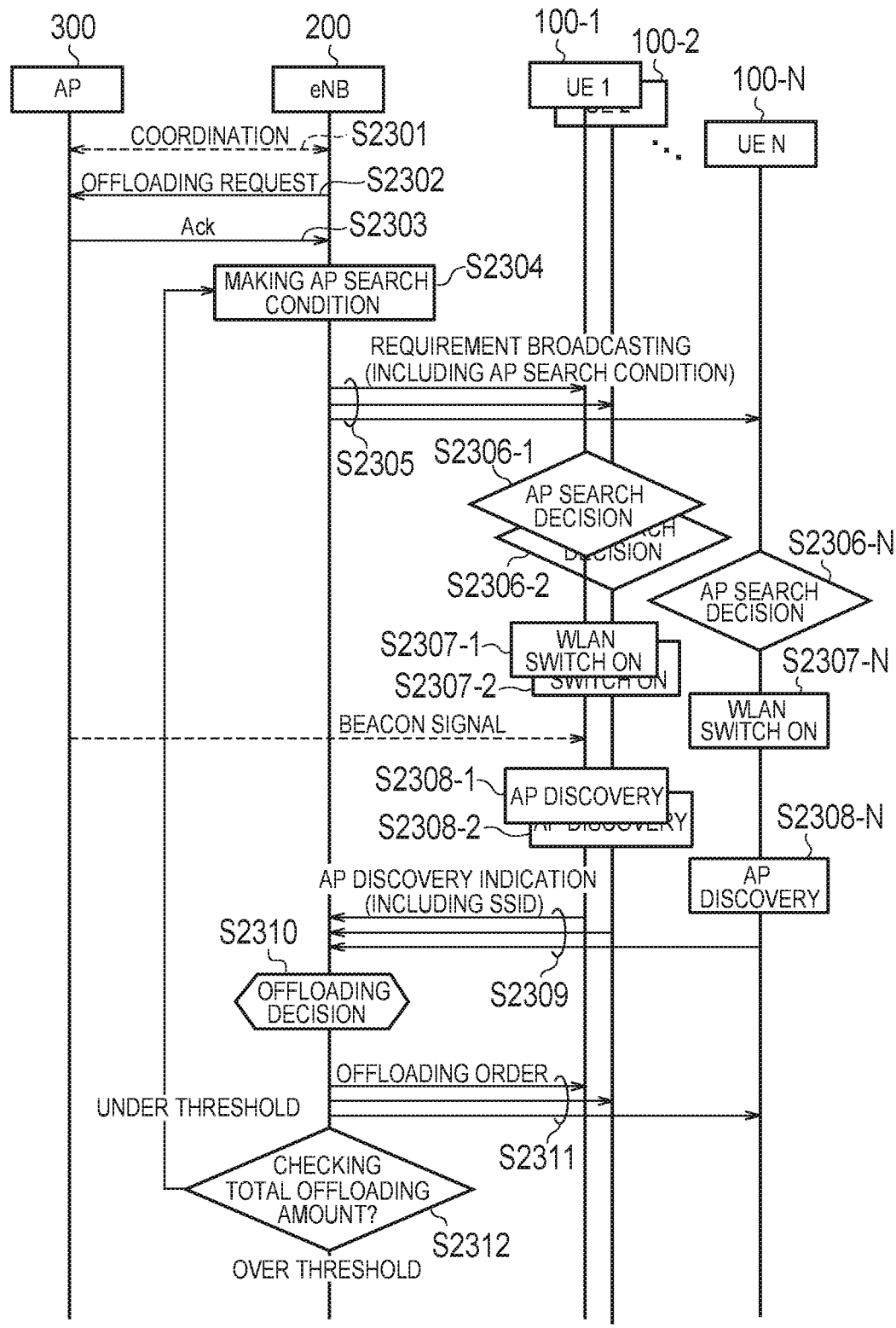
FIG. 12 is a sequence diagram of an operation pattern 3 according to the second embodiment.

FIG. 12 is the sequence diagram of an operation pattern 3 according to the second embodiment. In this case, a difference from the operation pattern 1 will be mainly described.

As shown in FIG. 12, steps S2301 to S2303 are the same as those in the operation pattern 1.

In step S2304, the eNB 200 decides a condition under which to perform the WLAN scanning (scanning execution condition). Examples of the scanning execution condition may include a condition that the WLAN is supported. The scanning execution condition may be defined according to an operator policy.

In step S2305, the eNB 200 transmits, to each UE 100 connecting to the eNB 200, the trigger information including the scanning execution condition by the broadcast. That is, such trigger information may be regarded as conditional WLAN turning on instruction.

The UE 100 that received the trigger information determines whether or not the scanning execution condition is satisfied, in step S2306. The UE 100 that determined that the scanning execution condition is satisfied switches the WLAN transceiver 112 to an ON state and performs the WLAN scanning, in step S2307. The subsequent operations are the same as those in the operation pattern 1.

In the second embodiment, the UE 100 may determine whether to use the information received from the eNB 200. For example, the UE 100 does not use the information received from the eNB 200, when it is assumed that the UE 100 will be out of the coverage of the eNB 200 by estimating that the UE 100 is moving at high speed based on the number of handovers per a time unit or location information and the like.

Alternatively, the UE 100 may determine whether to use the information received from the eNB 200, on the basis of one of a traffic amount and a traffic type exchanged by the UE 100, or radio communication environment of the UE 100. For example, the UE 100 uses the information received from the eNB 200, when the traffic amount exchanged by the UE 100 is heavy or when the QoS of traffic exchanged by the UE 100 is low. Otherwise, the UE 100 does not use the AP white list.

Third Embodiment

A third embodiment will be described on the basis mainly of a difference from the above-described first embodiment and second embodiment.

Figure 13:
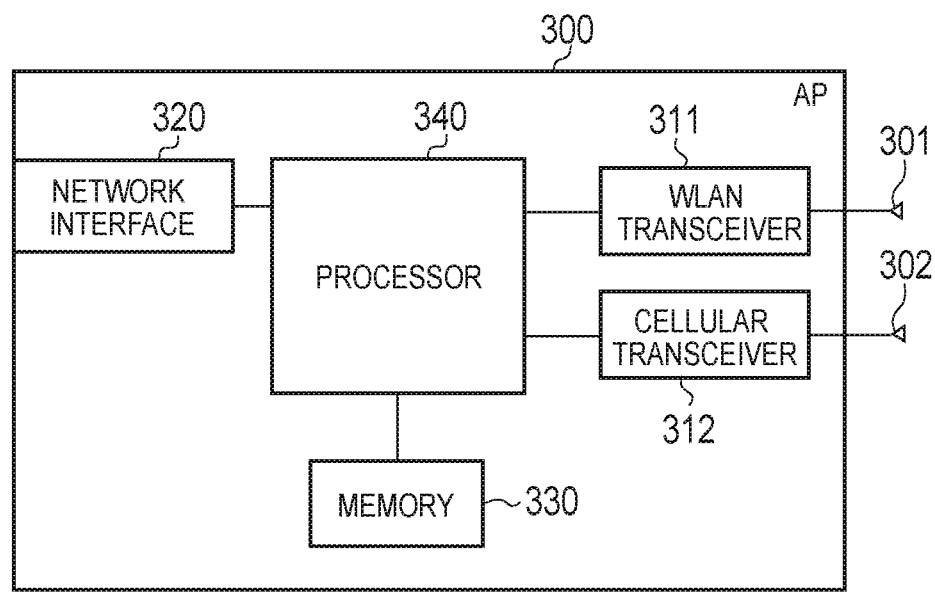
FIG. 13 is a block diagram of AP (wireless LAN access point) according to the third embodiment to the fifth embodiment.

The AP 300 according to the third embodiment is configured to be capable of transmitting a discovery signal (beacon signal) within a cellular frequency band. FIG. 13 is a block diagram of the AP 300 according to the third embodiment. As shown in FIG. 13, the AP 300 includes a cellular transceiver 312 in addition to the WLAN transceiver 311. Other configurations are the same as those in the first embodiment.

Figure 14:
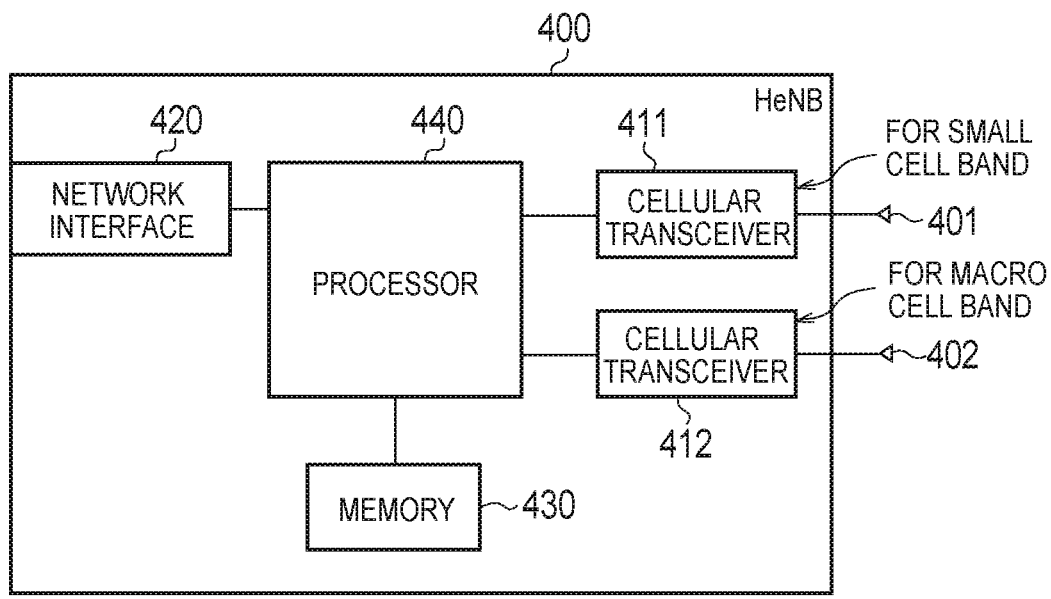
FIG. 14 is a block diagram of a small cell eNB according to the third embodiment.

Further, in the third embodiment, it is possible to offload not only to the AP 300 but also to the small cell. In the third embodiment, HeNB 400 (see FIG. 7) that manages a small cell is configured to be capable of transmitting the discovery signal at a frequency (first frequency) to which the macro cell belongs. The discovery signal transmitted by the HeNB 400 (small cell) may be one type of a cell-specific reference signal (CRS), and may be a signal transmitted in a higher density and a longer cycle than a normal CRS. FIG. 14 is a block diagram of the HeNB 400 according to the third embodiment. As shown in FIG. 14, the HeNB 400 includes, in addition to a cellular transceiver 411 for a small cell band (second frequency), a cellular transceiver 412 for a macro cell band (first frequency). Other configurations are the same as those in the eNB 200.

Figure 15:
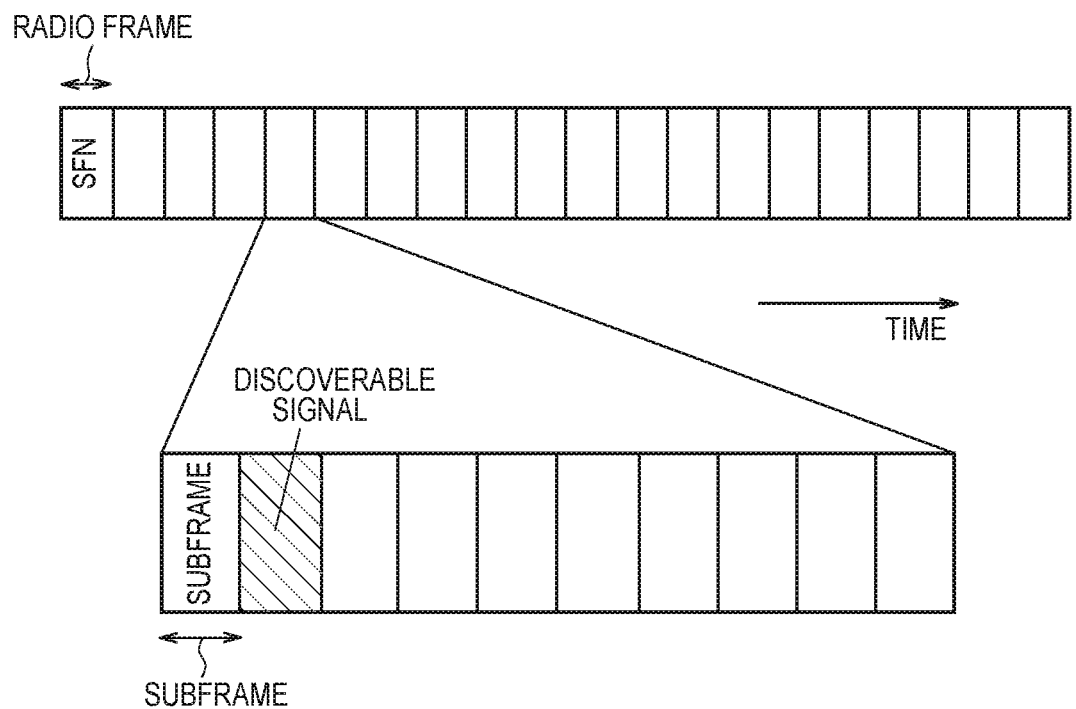
FIG. 15 is a diagram for illustrating an operation according to the third embodiment.

Hereinafter, the AP 300 and the eNB 400 are called "specific apparatus", where appropriate. In the third embodiment, as shown in FIG. 15, the specific apparatus broadcasts the discovery signal for informing of the presence of the specific apparatus within a cellular frequency band and in a specific period. The UE 100 connecting to the eNB 200 scans the discovery signal, by the cellular transceiver 111, within a cellular frequency band and in a specific period. In the third embodiment, the specific period is configured in a unit of subframe; however, the specific period may be configured in a unit of another time (such as a slot and a symbol).

That is, while the AP 300 performs WLAN communication in a WLAN frequency band different from the cellular frequency band, the AP 300 broadcasts the discovery signal (beacon signal) within the cellular frequency band. Further, while the HeNB 400 performs cellular communication within a small cell band, the HeNB 400 broadcasts the discovery signal within a macro cell band.

As a result, the UE 100 connecting to the eNB 200 (macro cell) is capable of being connected to the eNB 200 and receiving the discovery signal from the specific apparatus (the AP 300 and the HeNB 400), and thus, it is possible to easily discover the specific apparatus during being connected to the eNB 200. As a result, it is possible to connect the UE 100 to the specific apparatus. It is noted that the specific apparatus may suspend the broadcast of the discovery signal when the load level of the specific apparatus is high.

Information (such as subframe number) on the specific subframe may be previously stored in the UE 100, and may be notified by the eNB 200 to the UE 100. When the specific subframe is notified by the eNB 200 to the UE 100, the eNB 200 may cause the UE 100 to recognize the specific subframe as a subframe for MBMS (Multimedia Broadcast Multicast Service).

The eNB 200 and the specific apparatus preferably are synchronized; however, when asynchronous to each other, the specific apparatus needs to be synchronized with the eNB 200. The specific apparatus includes a function of communicating in the macro cell frequency band, and thus, when the specific apparatus accesses, as the UE 100, the eNB 200, it is possible to detect a downlink subframe timing of the eNB 200. In this case, the specific apparatus may detect the downlink subframe timing of the eNB 200 on the basis of the timing advance assigned from the eNB 200.

Further, in order for the UE 100 to easily receive the discovery signal, the eNB 200 preferably suspends the transmission by the eNB 200 and/or transmission by the UE 100 connecting to the eNB 100 in a specific subframe.

Figure 16:
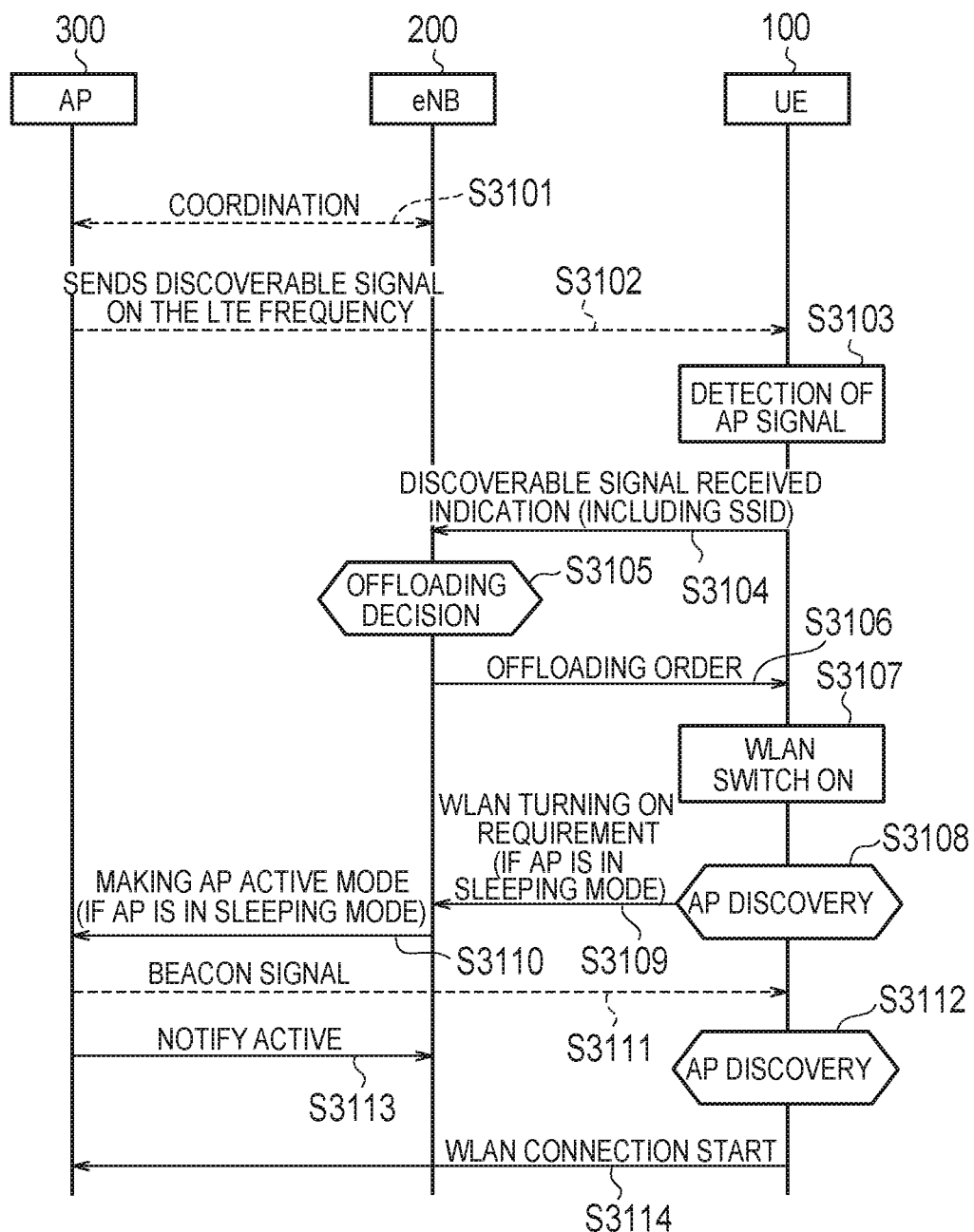
FIG. 16 is a sequence diagram of an operation pattern 1 according to the third embodiment.

Subsequently, a specific example of an operation according to the third embodiment will be described in which the specific apparatus is the AP 300. FIG. 16 is a sequence diagram of an operation pattern 1 according to the third embodiment. In an initial state of FIG. 16, the UE 100 is connected to the eNB 200 and sets so that the WLAN transceiver 112 is in an OFF state. Further, the eNB 200 and the AP 300 perform a negotiation for operating in interworking with each other (step S3101).

As shown in FIG. 16, in step S3102, the AP 300 broadcasts the discovery signal within a cellular frequency band and in a specific subframe. The discovery signal includes the identifier (SSID/ESSID) of the AP 300. The UE 100 connecting to the eNB 200 scans the discovery signal within a cellular frequency band and in a specific subframe.

In step S3103, the UE 100 detects, by the scan, the discovery signal (that is, discovers the AP 300) from the AP 300. Further, the UE 100 extracts the identifier (SSID/ESSID) included in the detected discovery signal.

In step S3104, the UE 100 transmits an AP discovery indication indicating that the AP 300 was discovered, to the eNB 200. The AP discovery indication includes the identifier (SSID/ESSID) of the discovered AP 300.

In step S3105, the eNB 200 determines whether or not the UE 100 is made to be connected to the AP 300 (that is, whether or not performs the offload) on the basis of the AP discovery indication received from the UE 100. Such a determination method is the same as that in the first embodiment. In this case, description is provided on the assumption that the eNB 200 determines that the UE 100 is made to be connected to the AP 300.

In step S3106, the eNB 200 transmits the connection instruction instructing the connection to the AP 300, to the UE 100. The connection instruction may include information designating a category of the traffic that the UE 100 should transmit to and receive from the AP 300. It is noted that at this time point, the WLAN transceiver 112 of the UE 100 is in an OFF state, and therefore, it is possible to regard the connection instruction as a WLAN scanning instruction.

In step S3107, in response to receiving connection instruction from the eNB 200, the UE 100 switches the WLAN transceiver 112 to an ON state, and starts the WLAN scanning in a WLAN frequency band.

In step S3108, when the AP 300 is not discovered by the scanning in a WLAN frequency band, the UE 100 determines that the WLAN transceiver 311 of the AP 300 is in an OFF state (sleep state), and transmits a WLAN on request to the eNB 200 (step S3109). Then, in step S3110, in response to the WLAN on request from the UE 100, the eNB 200 transmits a start-up instruction to the AP 300. As a result, the WLAN transceiver 311 of the AP 300 is switched to an ON state, a transmission of the beacon signal from the WLAN transceiver 311 is started (step S3111). Further, in step S3113, the AP 300 transmits, to the eNB 200, an notification to the effect that the start-up.

In step S3112, as a result of the scanning in the WLAN frequency band, the UE 100 detects the beacon signal (that is, discovers the AP 300) from the AP 300.

In step S3114, the UE 100 is connected to the AP 300, and starts WLAN communication with the AP 300. When the connection instruction includes the information designating the traffic type, the designated traffic type is transmitted and received by the WLAN communication.

The UE 100 may notify the eNB 200 of the completion of the connection when the connection with the AP 300 is completed. Alternatively, the AP 300 may notify the eNB 200 of the connection by the UE 100.

Figure 17:
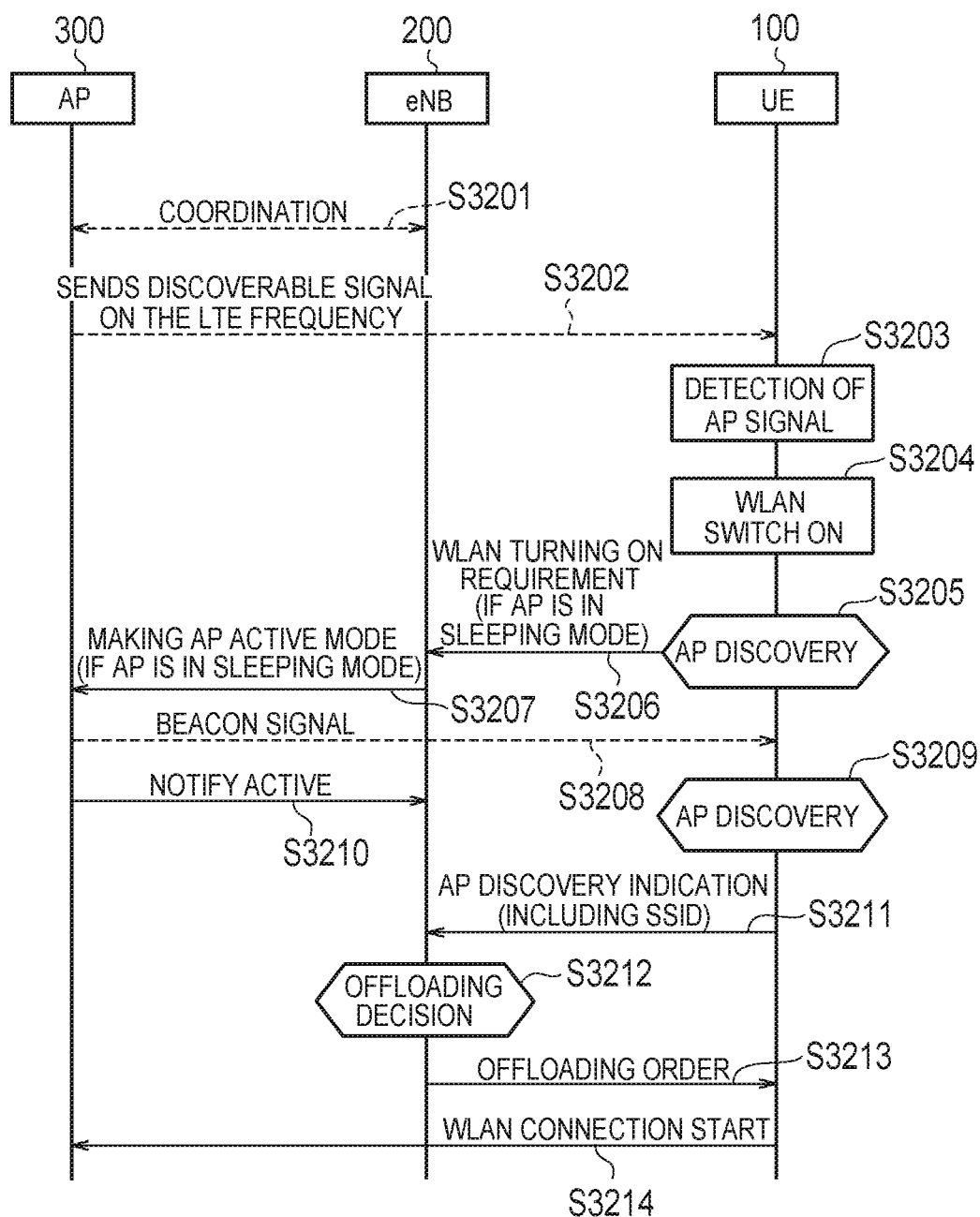
FIG. 17 is sequence diagram of an operation pattern 2 according to the third embodiment.

FIG. 17 is a sequence diagram of an operation pattern 2 according to the third embodiment. In this case, a difference from the operation pattern 1 will be mainly described.

In the above-described operation pattern 1, whether or not the UE 100 is made to be connected to the AP 300 is determined before the UE 100 discovers the AP 300 in the WLAN frequency band. On the other hand, in the operation pattern 2, as shown in FIG. 17, such a determination (step S3212) is performed after the UE 100 discovers the AP 300 in the WLAN frequency band (step S3209).

Specifically, in step S3211, the UE 100 transmits, to the eNB 200, the AP discovery indication indicating that the AP 300 was discovered in the WLAN frequency band. The AP discovery indication includes the identifier (SSID/ESSID) of the discovered AP 300.

In step S3212, the eNB 200 determines whether or not the UE 100 is made to be connected to the AP 300 (that is, whether or not performs the offload) on the basis of the AP discovery indication received from the UE 100. In this case, description is provided on the assumption that the eNB 200 determines that the UE 100 is made to be connected to the AP 300.

In step S3213, the eNB 200 transmits, to the UE 100, the connection instruction instructing the connection to the AP 300. The connection instruction may include information designating a category of the traffic that the UE 100 should transmit to and receive from the AP 300.

In step S3214, in response to the connection instruction from the eNB 200, the UE 100 is connected to the AP 300, and starts WLAN communication with the AP 300. Further, when connection instruction includes information designating the traffic type, the designated traffic type is transmitted and received by the WLAN communication.

Subsequently, a specific example of an operation according to the third embodiment will be described in which the specific apparatus is the HeNB 400 (small cell). When the specific apparatus is the HeNB 400, the same procedure as that in the operation pattern 1 may be applied, and the same procedure as that in the operation pattern 2 may be applied.

Figure 18:
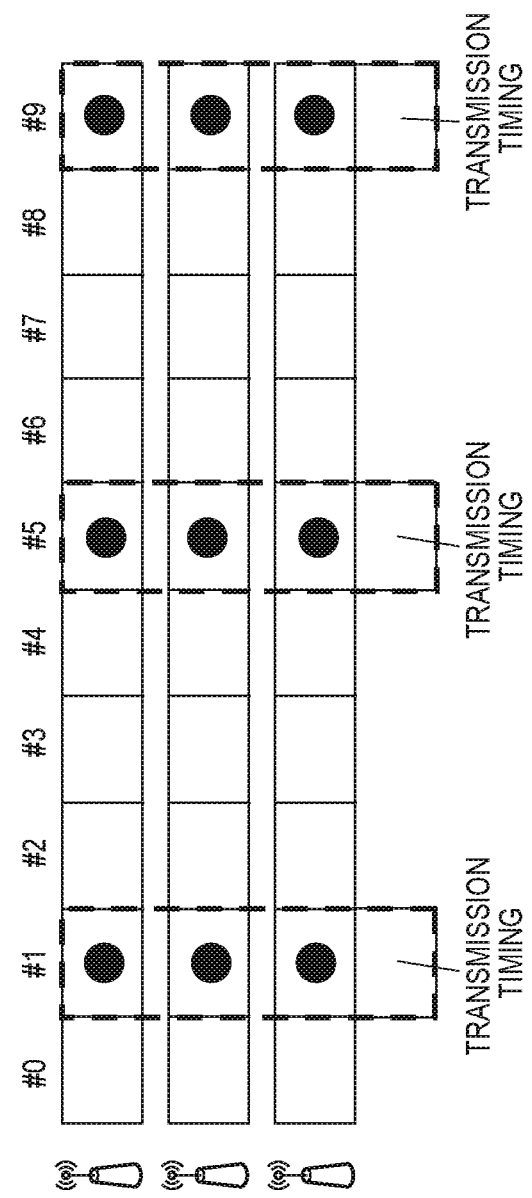
FIG. 18 is a diagram for illustrating an operation according to a third embodiment.
Figure 19:
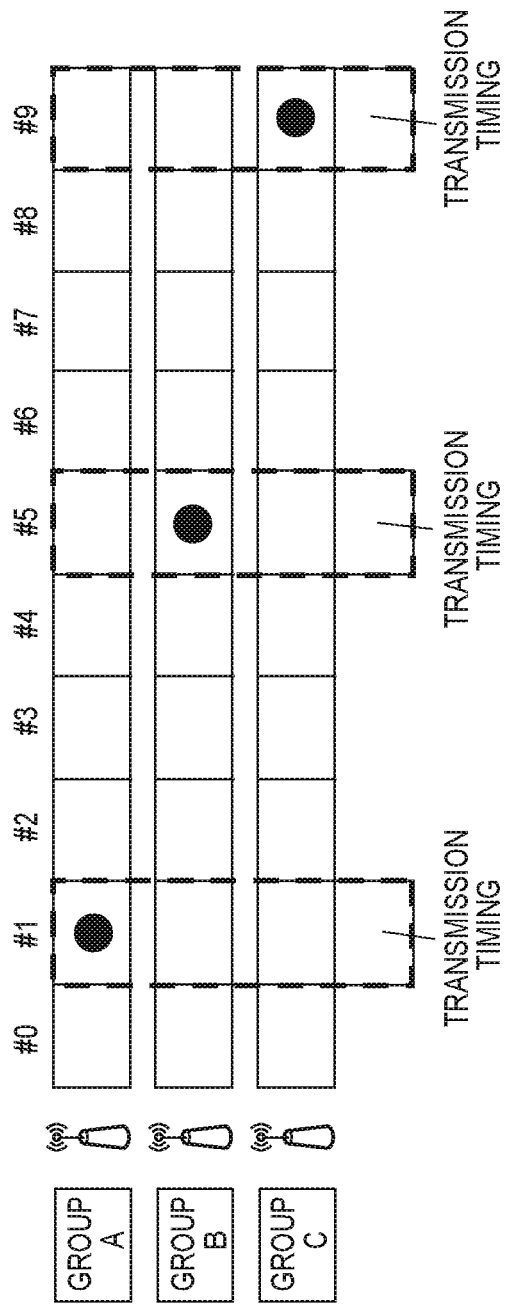
FIG. 19 is a diagram for illustrating an operation according to the third embodiment.

However, when a plurality of HeNBs 400 are arranged within a coverage of the HeNB 200, the transmission timing of the discovery signal preferably is set as follows: FIG. 18 shows a state where a plurality of HeNBs 400 transmit the discovery signal all at once in the same subframe. On the other hand, FIG. 19 shows a state where a plurality of HeNBs 400 are grouped in a specific group unit and the discovery signal is transmitted in a subframe different depending on each group.

When a plurality of HeNBs 400 are arranged within the coverage of the eNB 200, each HeNB 400 transmits the discovery signal in the frequency band (macro cell frequency band) of the eNB 200. However, the frequency band actually used by the HeNB 400 for communication is not the same, and the UE 100 does not support all the frequency bands. Therefore, even when the UE 100 detects the discovery signal from the HeNB 400 in the macro cell frequency band, if the frequency band of the HeNB 400 is not supported, then it is not possible to connect to the eNB 400.

In this case, the HeNBs 400 are grouped into each frequency band, and the discovery signal is to be transmitted in the subframe different depending on each group. Further, the UE 100 scans the discovery signal only in the subframe corresponding to the frequency band supported by the UE 100. In this way, the UE 100 is capable of discovering only the connectable HeNB 400.

It is noted that in the third embodiment, the AP 300 and the HeNB 400 are employed as the specific apparatus; however, the specific apparatus may be UE that supports an inter-terminal radio communication. The inter-terminal radio communication is called D2D (Device to Device) communication. In the D2D communication, a plurality of UEs directly perform communication without passing through the EPC 20. The UE that performs D2D communication within a cellular frequency band is capable of being positioned equally to the HeNB 400. On the other hand, the UE that performs D2D communication outside the cellular frequency band is capable of being positioned equally to the AP 300. Further, when a plurality of specific apparatus are included within the coverage of the eNB 200, the specific apparatus may be collected into each group and the discovery signal may be transmitted in a subframe different depending on each group.

Alternatively, the specific apparatus may be a cellular base station that performs communications in an unlicensed band.

Fourth Embodiment

A fourth embodiment will be described on the basis mainly of a difference from the above-described first embodiment to third embodiment. A system configuration and an operation environment according to the fourth embodiment are the same as those in the third embodiment.

In the above-described third embodiment, the AP 300 transmits the beacon signal as the discovery signal within the cellular frequency band. On the other hand, in the fourth embodiment, the AP 300 transmits a normal cellular reference signal (for example, CRS) within the cellular frequency band rather than transmitting the beacon signal within the cellular frequency band.

In the fourth embodiment, a cell identifier for identifying the AP 300 is assigned to the AP 300. That is, the AP 300 belongs to a WLAN system; the AP 300 is assigned the cell identifier used for the cellular communication system (LTE system). The eNB 200 stores the cell identifier assigned to the AP 300.

Figure 20:
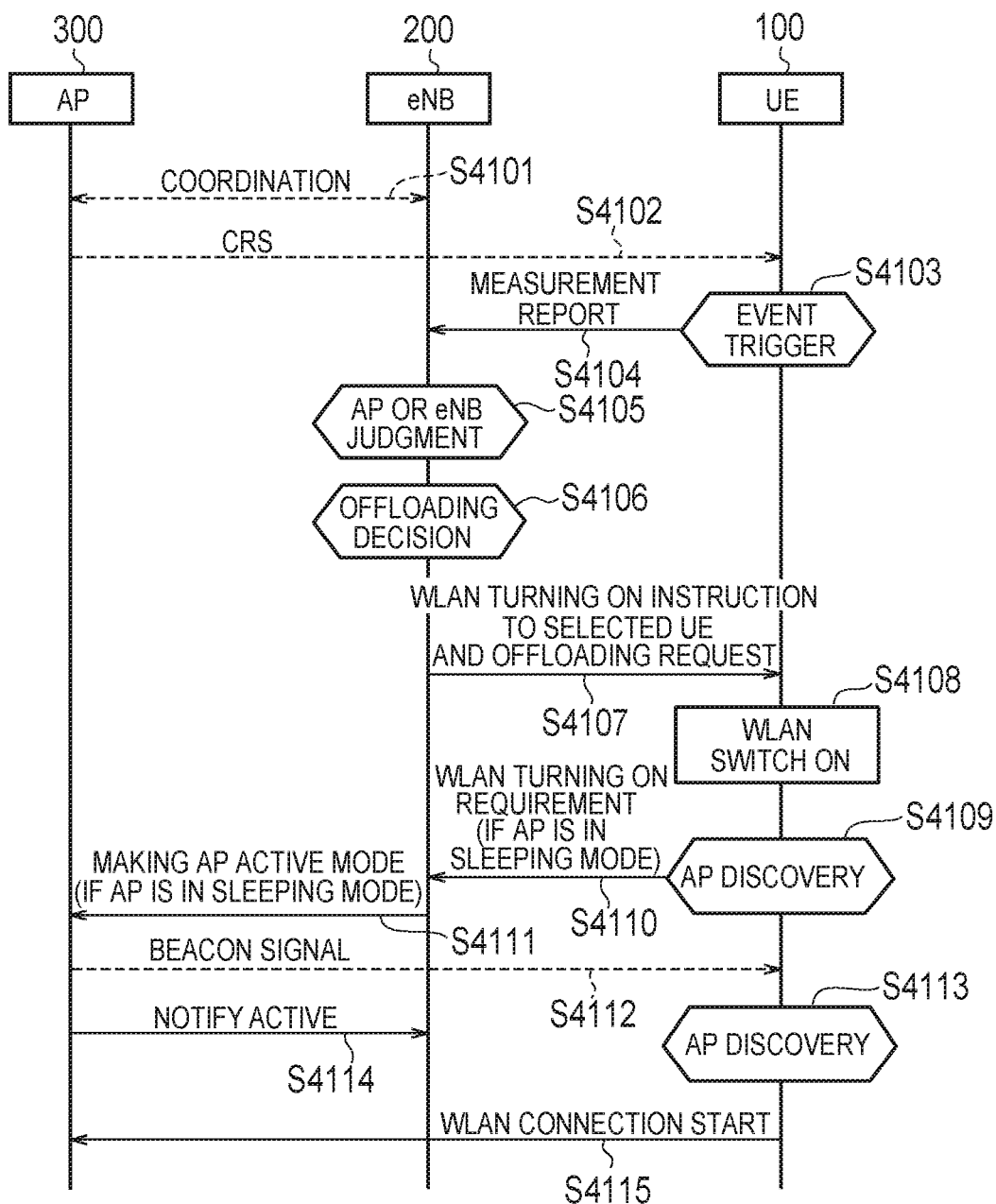
FIG. 20 is a sequence diagram according to the fourth embodiment.

FIG. 20 is a sequence diagram according to the fourth embodiment. In an initial state of FIG. 20, the UE 100 is connected to the eNB 200 and sets so that the WLAN transceiver 112 is in an OFF state. Further, the eNB 200 and the AP 300 perform a negotiation for operating in interworking with each other (step S4101).

As shown in FIG. 20, in step S4102, the AP 300 broadcasts the cellular reference signal within the cellular frequency band. The cellular reference signal transmitted by the AP 300 includes the cell identifier assigned to the AP 300.

The UE 100 connecting to the eNB 200 receives the cellular reference signal broadcast from the AP 300 within the cellular frequency band. In this case, when seen from the UE 100, it is not possible to know that the transmission source of the cellular reference signal is the AP 300, and thus, measurement on the cellular reference signal (for example, measurement on a received power) is performed according to a normal operation, and measurement information indicating a measurement result is reported to the eNB 200 (step S4104). The measurement information includes a cell identifier of a cell to be measured.

In step S4105, on the basis of the measurement information reported from UE 100, the eNB 200 determines whether or not the UE 100 received the cellular reference signal from the AP 300. Once the eNB 200 confirms that the cell identifier included in the measurement information matches the cell identifier assigned to the AP 300, for example, the eNB 200 determines that the UE 100 received the cellular reference signal from the AP 300.

In step S4106, the eNB 200 determines whether or not the UE 100 is made to be connected to the AP 300 (that is, whether or not performs the offload). Such a determination method is the same as that in the first embodiment. The subsequent operations are the same as those in the operation pattern 1 according to the third embodiment.

Instead of AP 300, a cellular base station that performs communications in an unlicensed band may be used in the fourth embodiment.

Fifth Embodiment

A fifth embodiment will be described on the basis mainly of a difference from the above-described first embodiment to fourth embodiment. A system configuration and an operation environment according to the fifth embodiment are the same as those in the third embodiment.

In the fifth embodiment, the AP 300 detects the UE 100 having approached the AP 300 by detecting a cellular uplink signal transmitted from the UE 100 connecting to the eNB 200. The AP 300 transmits, to the eNB 200, a notification indicating that the UE 100 approaches the AP 300 on the basis of the detection of the cellular uplink signal. The eNB 200 transmits, to the UE 100, information for scanning the AP 300 on the basis of the notification from the AP 300.

In operation pattern 1 and 2 according to the fifth embodiment, the AP 300 acquires, from the eNB 200, signal information on the cellular uplink signal transmitted by the UE 100, and on the basis of the signal information, the AP 300 estimates a pathloss between the UE 100 and the AP 300. The AP 300 determines that the UE 100 approaches the AP 300 when the pathloss is less than a threshold.

In an operation pattern 3 according to the fifth embodiment, the AP 300 determines whether or not the UE 100 approaches the AP 300 on the basis of a distance between the AP 300 and the eNB 200 and a received power of the cellular uplink signal.

Figure 21:
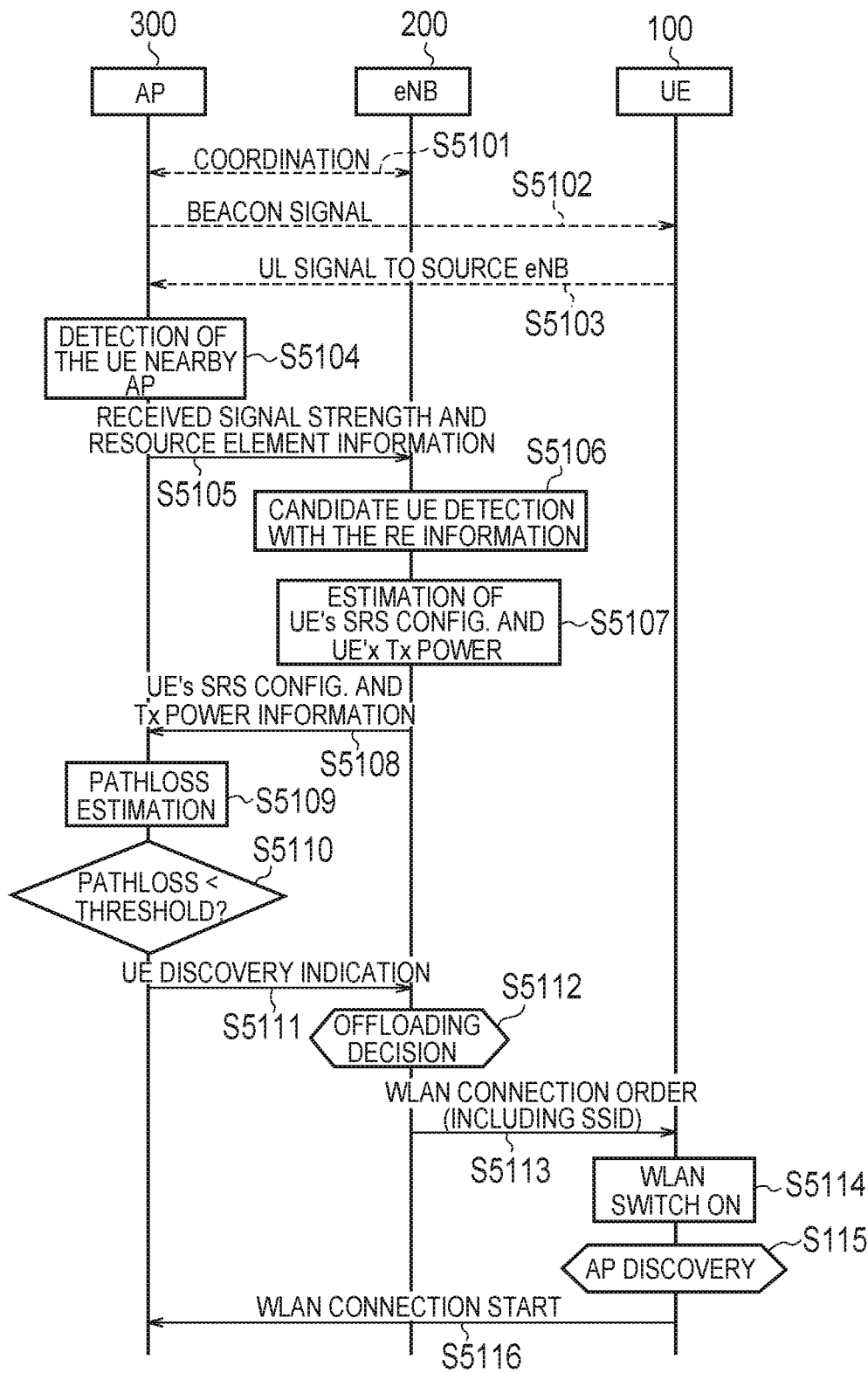
FIG. 21 is a sequence diagram of an operation pattern 1 according to the fifth embodiment.

FIG. 21 is a sequence diagram of the operation pattern 1 according to the fifth embodiment. In an initial state of FIG. 21, the UE 100 is connected to the eNB 200 and sets so that the WLAN transceiver 112 is in an OFF state. Further, the eNB 200 and the AP 300 perform a negotiation for operating in interworking with each other (step S5101).

As shown in FIG. 21, in step S5102, the AP 300 transmits the beacon signal.

In step S5103, the UE 100 transmits the cellular uplink signal to the eNB 200. The cellular uplink signal may be an uplink reference signal (SRS: Sounding Reference Signal), for example.

In step S5104, the AP 300 receives the cellular uplink signal from the UE 100, and detects the presence of the UE 100. Further, the AP 300 measures the received power of the cellular uplink signal from the UE 100, and specifies a resource element corresponding to the cellular uplink signal.

In step S5105, the AP 300 transmits the information on the specified resource element to the eNB 200. The AP 300 may transmit also information on the measured uplink received power to the eNB 200.

In step S5106, on the basis of the resource element information received from the AP 300, the eNB 200 specifies the UE 100 to which that resource element is assigned. It is noted that in the fifth embodiment, it is assumed that the eNB 200 stores information on an assignment history.

In step S5107, the eNB 200 specifies SRS setting information and an uplink transmission power of the specified UE 100.

In step S5108, the eNB 200 transmits, to the AP 300, the specified SRS setting information and information on uplink transmission power.

In step S5109, the AP 300 estimates the pathloss between the UE 100 and the AP 300 on the basis of the SRS setting information and the uplink transmission power received from the eNB 200. It is possible to obtain the pathloss by subtracting "the received power of the AP 300 (received power measured in step S5104) from "the transmission power of the UE 100 (the transmission power obtained in step S5108)".

In step S5110, the AP 300 confirms whether or not the pathloss is less than a threshold by comparing the estimated pathloss with the threshold. In this case, description is provided on the assumption that the pathloss is less than a threshold.

In step S5111, the AP 300 transmits, to the eNB 200, a notification indicating that the UE 100 approaches the AP 300.

In step S5112, the eNB 200 determines whether or not the UE 100 is made to be connected to the AP 300. Such a determination method is the same as that in the first embodiment. In this case, description is provided on the assumption that it is determined that the UE 100 is made to be connected to the AP 300.

In step S5113, the eNB 200 transmits, to the UE 100, a connection instruction (scanning instruction) instructing a connection to the AP 300. The connection instruction includes the identifier (SSID/ESSID) of the AP 300.

In step S5114, in response to the receipt of the connection instruction, the UE 100 switches the WLAN transceiver 112 to an ON states, and performs a scanning.

In step S5115, the UE 100 discovers the AP 300 by the scan.

In step S5116, the UE 100 is connected to the AP 300.

Figure 22:
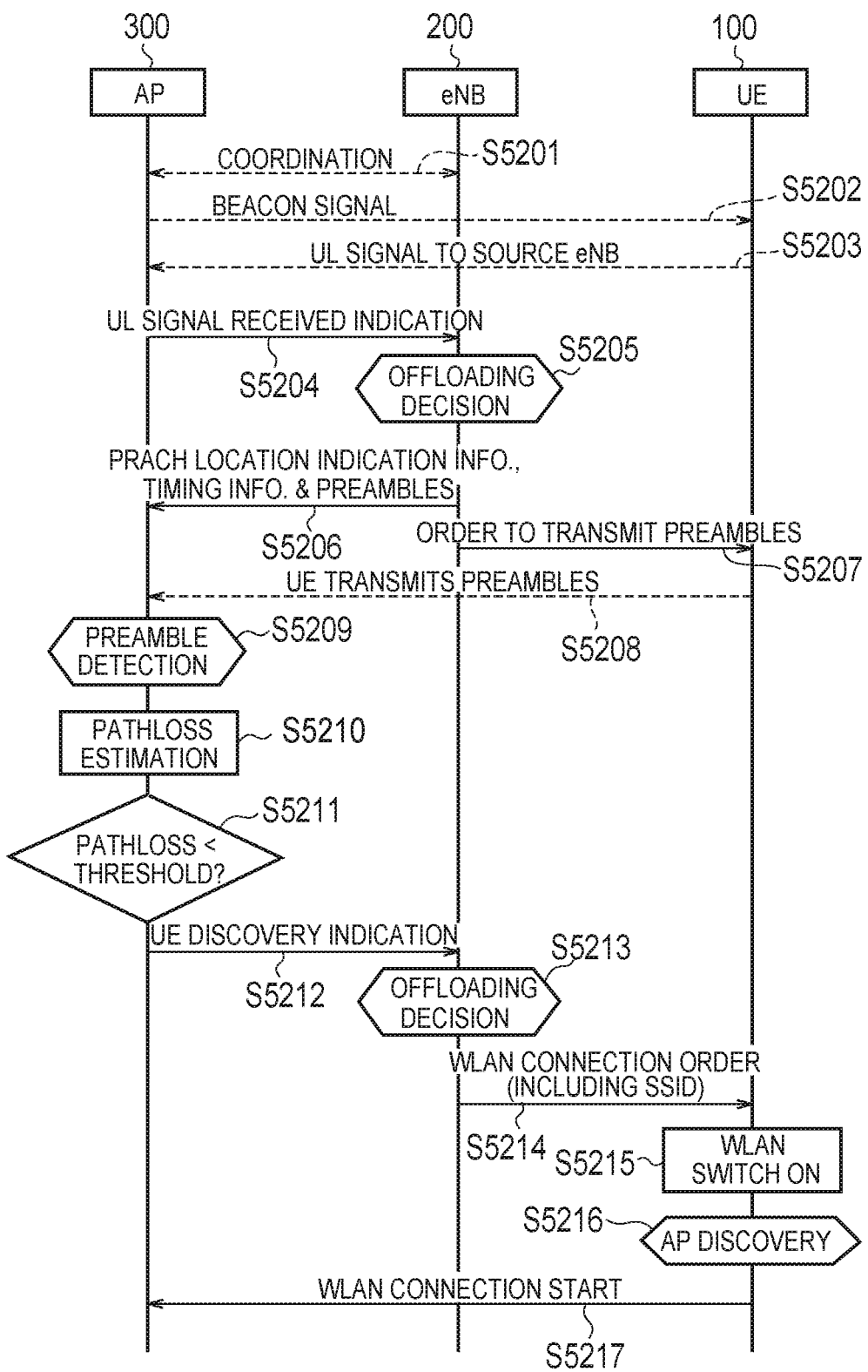
FIG. 22 is a sequence diagram of an operation pattern 2 according to the fifth embodiment.

FIG. 22 is a sequence diagram of the operation pattern 2 according to the fifth embodiment. In this case, a difference from the operation pattern 1 will be mainly described. The operation pattern 2 differs from the operation pattern 1 in the approach detection method in the AP 300.

As shown in FIG. 22, steps S5201 to S5203 are the same as those in the operation pattern 1.

In step S5204, the AP 300 transmits, to the eNB 200, a notification indicating that the cellular uplink signal from the UE 100 is received.

In step S5205, the eNB 200 determines whether or not the UE 100 is made to be connected to the AP 300. In this case, the eNB 200 determines roughly, e.g., determines only the need of the offload. In this case, description is provided on the assumption that the eNB 200 determines that the UE 100 is made to be connected to the AP 300.

In step S5206, the eNB 200 transmits, to the AP 300, information (such as a transmission power, a transmission timing, and a preamble) on a physical random access channel (PRACH) assigned to the UE 100.

In step S5207, the eNB 200 instructs the UE 100 to transmit the preamble (preamble notified to the AP 300 in step S5206) on the PRACH.

In step S5208, the UE 100 transmits the preamble on the PRACH in accordance with the instruction from the eNB 200.

In step S5209, the AP 300 detects the preamble from the UE 100 on the basis of the information from the eNB 200, and measures the received power.

In step S5210, the AP 300 estimates the pathloss between the UE 100 and the AP 300 on the basis of the detected preamble. It is possible to obtain the pathloss by subtracting "the received power of the AP 300 (received power measured in step S5209) from "the transmission power of the UE 100 (the transmission power obtained in step S5206)".

The subsequent operations are the same as those in the operation pattern 1.

Subsequently, an operation pattern 3 according to the fifth embodiment will be described. In the operation pattern 3, after detecting the cellular uplink signal from the UE 100, the AP 300 determines whether or not the UE 100 approaches the AP 300 without acquiring the information from the eNB 200. Specifically, the AP 300 confirms that the AP 300 is arranged far from the eNB 200, and then, the AP 300 determines that the UE 100 approaches the AP 300 when the received power of the cellular uplink signal from the UE 100 is high.

Instead of AP 300, a cellular base station that performs communications in an unlicensed band may be used in the fifth embodiment.

Sixth Embodiment

A sixth embodiment will be described on the basis mainly of a difference from the above-described first embodiment to fifth embodiment. A system configuration and an operation environment according to the fifth embodiment are the same as those in the first embodiment.

In the above-described first embodiment to fifth embodiment, the UE 100 is made to be connected to the AP 300 to the utmost. On the other hand, in the fifth embodiment, under a specific circumstance, the UE 100 is not made to be connected to the AP 300 to the most. Specifically, as shown in FIG. 7, the coverage of the AP 300 is narrow, so that the UE 100 that moves at high speed quickly passes through the coverage of the AP 300. Therefore, it is efficient for the UE 100 that moves at high speed not to perform the WLAN scanning.

Therefore, in the sixth embodiment, the UE 100 connecting to the eNB 200 derives a moving velocity of the UE 100, and when the moving velocity exceeds a threshold, the UE 100 suspends the WLAN scanning even when the WLAN transceiver 112 is in an ON state.

Figure 23:
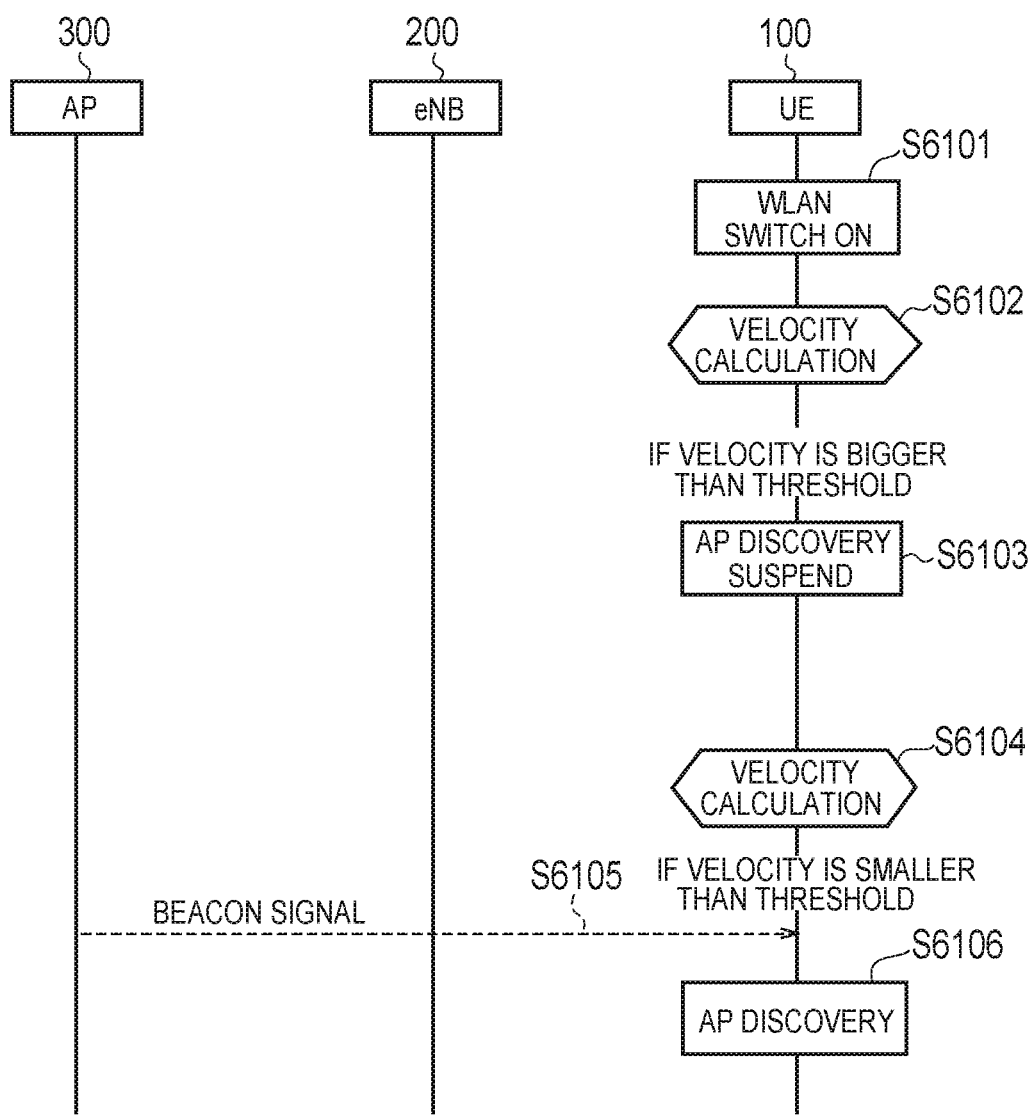
FIG. 23 is a sequence diagram according to the sixth embodiment.

FIG. 23 is a sequence diagram according to the sixth embodiment. In an initial state of FIG. 23, the UE 100 is connected to the eNB 200 and sets so that the WLAN transceiver 112 is in an OFF state.

In step S6101, the UE 100 switches the WLAN transceiver 112 to an ON state, and starts the WLAN scanning.

In step S6102, the UE 100 derives (calculates) the moving velocity of the UE 100. It is possible to derive the moving velocity of the UE 100 from UE location information obtained from GNSS, for example. Then, the UE 100 determines whether or not the moving velocity of the UE 100 exceeds a threshold. In this case, description is provided on the assumption that the UE 100 determines that the moving velocity of the UE 100 exceeds a threshold.

In step S6103, the UE 100 suspends the WLAN scanning.

In step S6104, the UE 100 derives (calculates) the moving velocity of the UE 100. Then, the UE 100 determines whether or not the moving velocity of the UE 100 exceeds a threshold. In this case, description is provided on the assumption that the UE 100 determines that the moving velocity of the UE 100 is equal to or less than a threshold. In this case, the UE 100 resumes the WLAN scanning.

In step S6105, the UE 100 receives the beacon signal from the AP 300.

In step S6106, the UE 100 detects, by the scan, the beacon signal from the AP 300 (that is, discovers the AP 300).

It is noted that in the sixth embodiment, the moving velocity of the UE 100 serves as the determination criteria to restrict the connection to the AP 300; however, another determination criteria may be used. For example, a traffic type is used as the determination criteria, and when the traffic type that the UE 100 transmits and receives is a specific traffic type (for example, a traffic having high QoS), the connection restriction to the AP 300 may be performed. In this case, it is possible to prevent interruption of the communication by switching the connection to the AP 300.

Seventh Embodiment

A seventh embodiment will be described on the basis mainly of a difference from the above-described first embodiment to sixth embodiment. A system configuration and an operation environment according to the seventh embodiment are the same as those in the first embodiment.

In the seventh embodiment, similarly to the sixth embodiment, a connection restriction to the AP 300 is performed under a specific circumstance. However, in the seventh embodiment, the connection restriction to the AP 300 is performed with being led by the eNB 200.

The eNB 200 according to the seventh embodiment transmits, to the UE 100 connecting to the eNB 200, control information controlling whether the UE 100 performs the WLAN scanning.

In an operation pattern 1 according to the seventh embodiment, the eNB 200 transmits the control information instructing to perform the scanning when a condition under which to perform the scanning is satisfied, and transmits the control information instructing to suspend the scanning when the condition is not satisfied.

In an operation pattern 2 according to the seventh embodiment, the eNB 200 includes condition information indicating a condition under which to perform the scanning or a condition under which to suspend the scan, in the control information. In this case, the UE 100 determines whether or not to suspend the scanning on the basis of the condition information.

Figure 24:
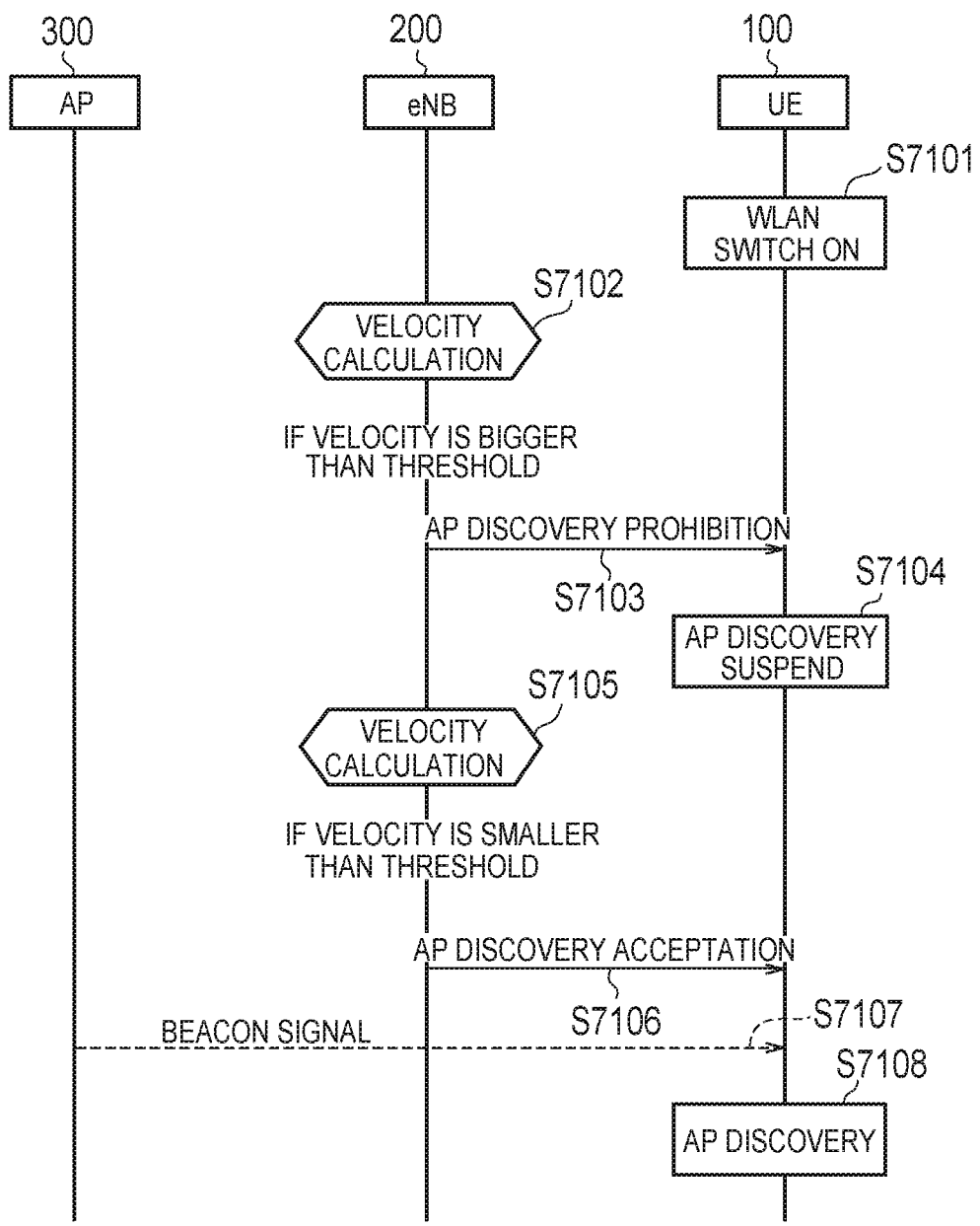
FIG. 24 is sequence diagram of an operation pattern 1 according to the seventh embodiment.

FIG. 24 is a sequence diagram of the operation pattern 1 according to the seventh embodiment. In an initial state of FIG. 24, the UE 100 is connected to the eNB 200 and sets so that the WLAN transceiver 112 is in an OFF state.

As shown in FIG. 24, in step S7101, the UE 100 switches the WLAN transceiver 112 to an ON state, and starts the WLAN scanning.

In step S7102, the eNB 200 derives (calculates) the moving velocity of the UE 100. As the moving velocity of the UE 100, UE moving velocity information (number of times of handovers per unit time) managed by the EPC 20, for example, may be used. Then, the eNB 200 determines whether or not the moving velocity of the UE 100 exceeds a threshold. In this case, description is provided on the assumption that the eNB 200 determines that the moving velocity of the UE 100 exceeds a threshold.

In step S7103, the eNB 200 transmits the control information instructing to suspend the scan, to the UE 100.

In step S7104, the UE 100 suspends the WLAN scanning in accordance with the control information from the eNB 200.

In step S7105, the eNB 200 derives (calculates) the moving velocity of the UE 100. Then, the eNB 200 determines whether or not the moving velocity of the UE 100 exceeds a threshold. In this case, description is provided on the assumption that the eNB 200 determines that the moving velocity of the UE 100 is equal to or less than a threshold.

In step S7106, the eNB 200 transmits, to the UE 100, the control information instructing to perform the scan. The UE 100 resumes the WLAN scanning in accordance with the control information from the eNB 200.

In step S7107, the UE 100 receives the beacon signal from the AP 300.

In step S7108, the UE 100 detects, by the scan, the beacon signal (that is, discovers the AP 300) from the AP 300.

It is noted that in the operation pattern 1, the moving velocity of the UE 100 serves as the determination criteria to restrict the connection to the AP 300; however, another determination criteria may be used. For example, a traffic type is used as the determination criteria, and when the UE 100 starts transmitting and receiving a specific traffic type (for example, a traffic having high QoS), the connection restriction to the AP 300 may be performed. Alternatively, a load level of the eNB 200 is used as the determination criteria, and when the load level of the eNB 200 is low, the connection restriction to the AP 300 may be performed. Alternatively, radio quality between the UE 100 and the eNB 200 is used as the determination criteria, and when the radio quality is high, the connection restriction to the AP 300 may be performed.

Figure 25:
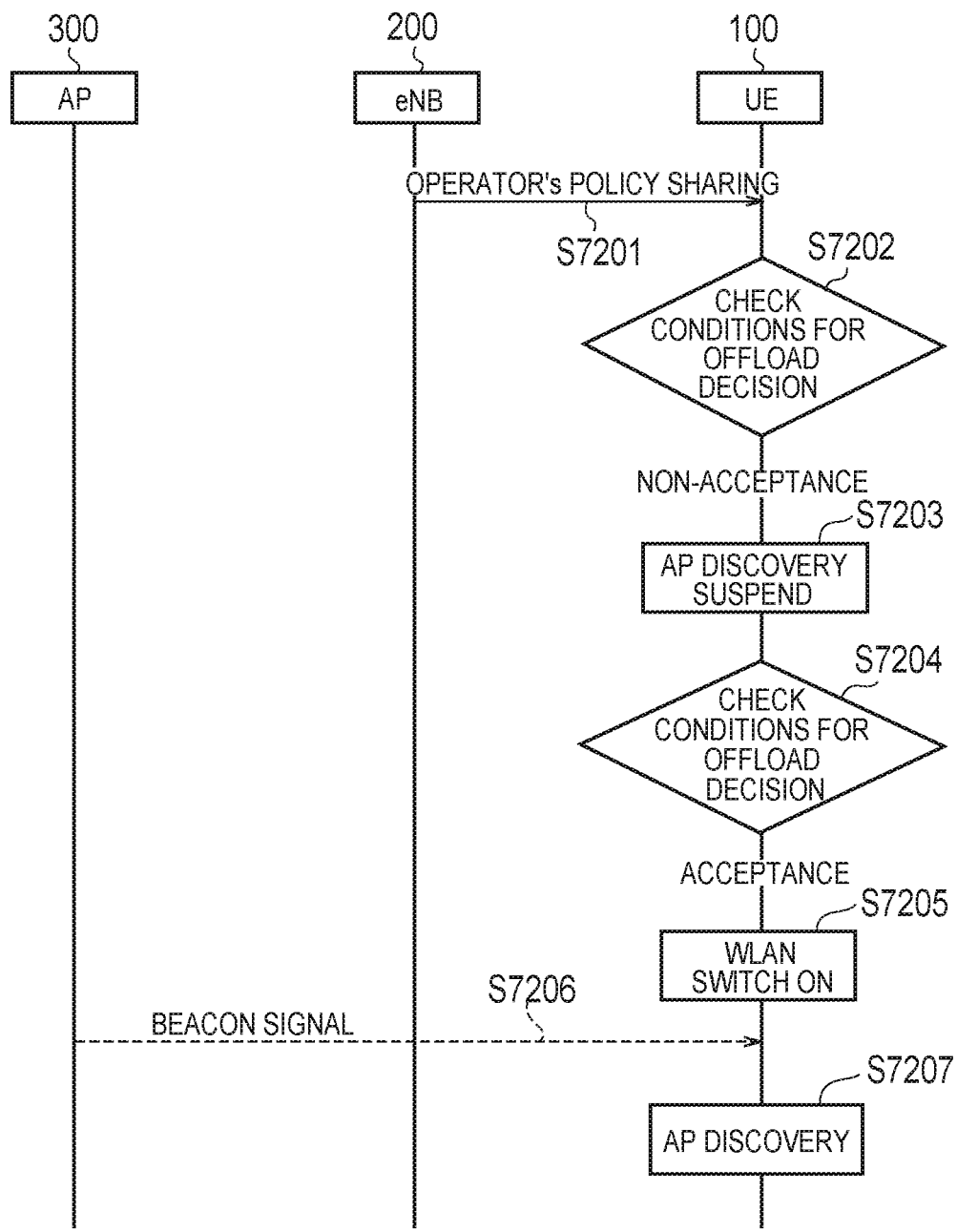
FIG. 25 is a sequence diagram of an operation pattern 2 according to the seventh embodiment.

FIG. 25 is a sequence diagram of the operation pattern 2 according to the seventh embodiment. In this case, a difference from the operation pattern 1 will be mainly described.

In step S7201, the eNB 200 transmits, to the UE 100, control information including condition information indicating a condition under which to perform the scanning or a condition under which to suspend the scan. Examples of the determination criteria designated by the condition information include a UE moving velocity, the traffic type, and radio quality, as described above.

In step S7202, the UE 100 determines whether or not a condition indicated by the condition information is satisfied. In this case, description is provided on the assumption that a condition under which to perform a scanning is not satisfied (or a condition under which to suspend a scanning is satisfied).

In step S7203, the UE 100 suspends the WLAN scanning.

In step S7204, the UE 100 determines whether or not a condition indicated by the condition information is satisfied. In this case, description is provided on the assumption that a condition under which to perform a scanning is satisfied (or a condition under which to suspend a scanning is not satisfied).

In step S7205, the UE 100 switches the WLAN transceiver 112 to an ON state, and starts the WLAN scanning.

In step S7206, the UE 100 receives the beacon signal from the AP 300.

In step S7207, the UE 100 detects, by the scan, the beacon signal (that is, discovers the AP 300) from the AP 300.

Eighth Embodiment

An eighth embodiment will be described on the basis mainly of a difference from the above-described first embodiment to seventh embodiment. A system configuration and an operation environment according to the eighth embodiment are the same as those in the first embodiment.

In the eighth embodiment, the connection target of the UE 100 is switched from the AP 300 to the eNB 200. In the eighth embodiment, the UE 100 transmits, to the eNB 200, notification information indicating a switch from the AP 300 to the eNB 200, when switching the connection target from the AP 300 to the eNB 200. The notification information includes an identifier (SSID/ESSID) for identifying the AP 300 and/or an identifier for identifying the UE 100. The eNB 200 transmits, to the AP 300, request information requesting to transfer transmission data addressed to the UE 100 to the eNB 200, on the basis of the notification information.

Figure 26:
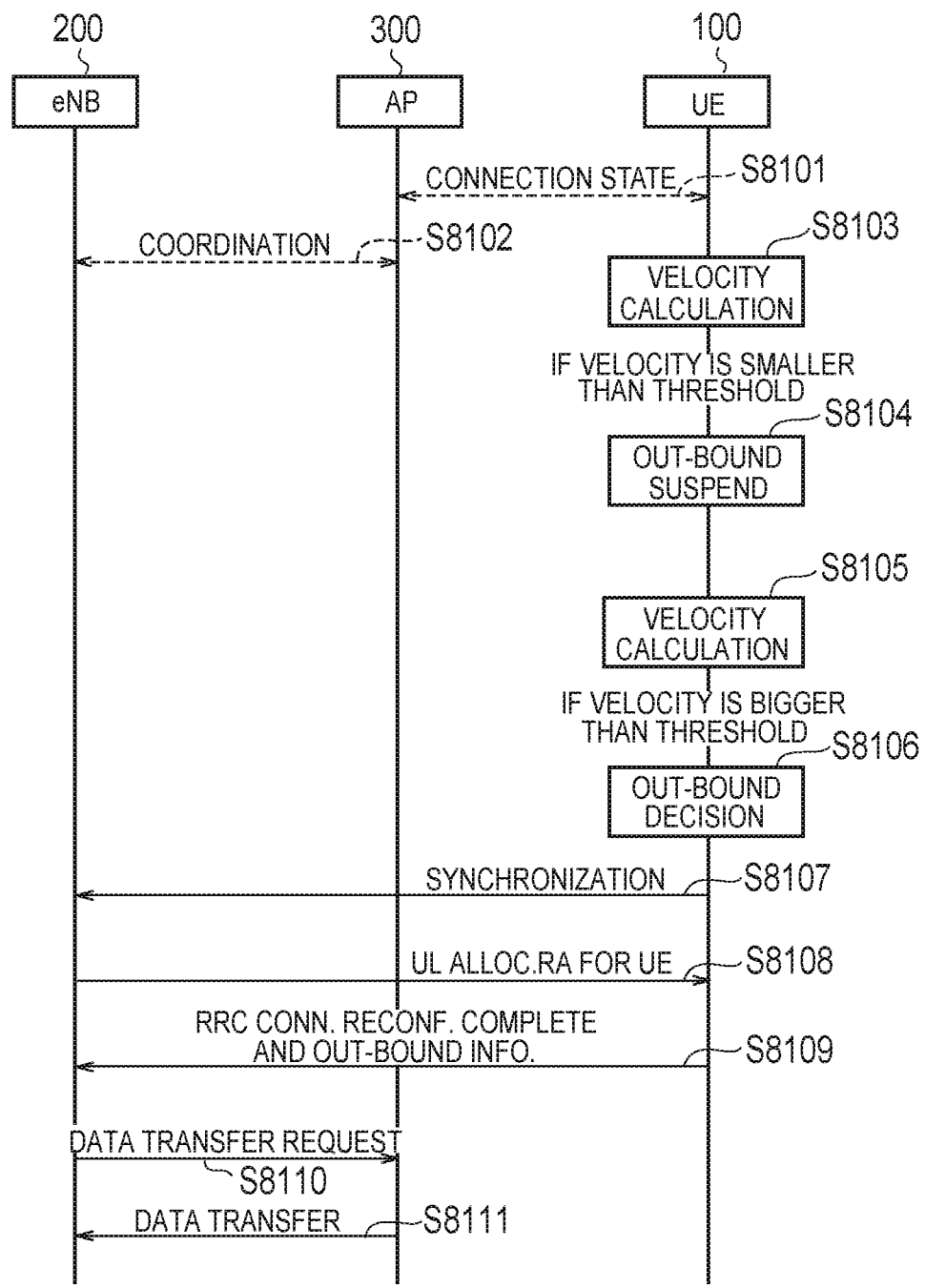
FIG. 26 is a sequence diagram of an operation pattern 1 according to the eighth embodiment.

FIG. 26 is a sequence diagram of an operation pattern 1 according to the eighth embodiment. In the operation pattern 1, under a circumstance where it is estimated that the UE 100 connecting to the AP 300 moves outside the coverage of the AP 300, the connection target of the UE 100 is switched from the AP 300 to the eNB 200. It is noted that in an initial state of FIG. 26, the UE 100 is connected to the AP 300 (step S8101). Further, the eNB 200 and the AP 300 perform a negotiation for operating in interworking with each other (step S8102).

As shown in FIG. 26, in step S8103, the UE 100 derives (calculates) the moving velocity of the UE 100. It is possible to derive the moving velocity of the UE 100 from UE location information obtained from GNSS, for example. Then, the UE 100 determines whether or not the moving velocity of the UE 100 exceeds a threshold. In this case, description is provided on the assumption that the UE 100 determines that the moving velocity of the UE 100 is equal to or less than a threshold.

In step S8104, the UE 100 will not switch from the AP 300 to the eNB 200.

In step S8105, the UE 100 derives (calculates) the moving velocity of the UE 100. Then, the UE 100 determines whether or not the moving velocity of the UE 100 exceeds a threshold. In this case, description is provided on the assumption that the UE 100 determines that the moving velocity of the UE 100 exceeds a threshold.

In step S8106, it is decided to switch the AP 300 to the eNB 200.

In steps S8107 to S8109, the UE 100 performs a random access procedure and an RRC connection establishment procedure, with the eNB 200. In the RRC connection establishment procedure, the UE 100 transmits, to the eNB 200, notification information (Out-bound info.) indicating a switch from the AP 300 to the eNB 200.

In step S8110, the eNB 200 transmits, to the AP 300, request information requesting to transfer transmission data addressed to the UE 100 to the eNB 200, on the basis of the notification information received from the UE 100.

In step S8111, the AP 300 transfers, to the eNB 200, the transmission data addressed to the UE 100 in response to the request information received from the eNB 200. The eNB 200 transmits, to the UE 100, the transmission data received from the AP 300. As a result, it is possible to seamlessly switch from the AP 300 to eNB 200.

It is noted that in the operation pattern 1, the moving velocity of the UE 100 serves as the determination criteria, and the switch determination from the AP 300 to the eNB 200 is performed; however, another determination criteria may be used. For example, a received power (RSSI) of the WLAN signal received by the UE 100 from the AP 300 is used as the determination criteria, and when the RSSI falls below a threshold, a switch from the AP 300 to the eNB 200 may be decided.

Figure 27:
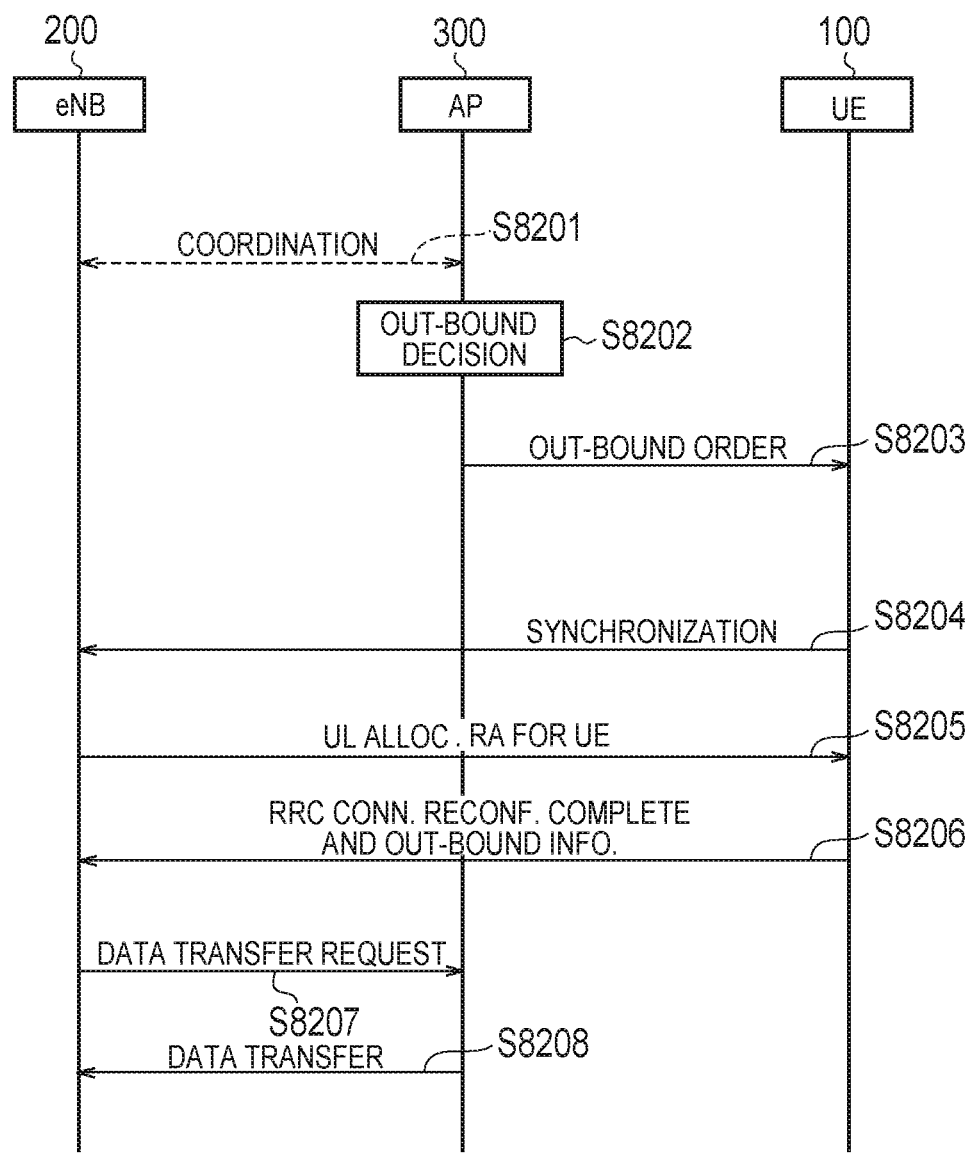
FIG. 27 is a sequence diagram of an operation pattern 2 according to the eighth embodiment.

FIG. 27 is a sequence diagram of an operation pattern 2 according to the eighth embodiment. In the operation pattern 2, under a circumstance where the load level of the AP 300 is high, for example, the connection target of the UE 100 is switched from the AP 300 to the eNB 200. In this case, a difference from the operation pattern 1 will be mainly described.

In step S8202, the AP 300 determines whether or not to switch the connection target of the UE 100 from the AP 300 to the eNB 200, on the basis of the load level of the AP 300. The AP 300 determines to switch the connection target of the UE 100 from the AP 300 to the eNB 200, when the load level of the AP 300 exceeds a threshold, for example. In this case, description is provided on the assumption that the AP 300 determines that a connection target of the UE 100 is switched from the AP 300 to the eNB 200.

In step S8203, the AP 300 transmits, to the UE 100, a switch instruction to switch from the AP 300 to the eNB 200. The subsequent processes are the same as those in the operation pattern 1.

It is noted that in the operation pattern 2, the load level of the AP 300 served as the determination criteria, and the switch determination from the AP 300 to the eNB 200 is performed; however, another determination criteria may be used. For example, the moving velocity of the UE 100 may be used as the determination criteria.

Instead of AP 300, a cellular base station that performs communications in an unlicensed band may be used in the eighth embodiment.

Ninth Embodiment

A ninth embodiment will be described on the basis mainly of a difference from the above-described first embodiment to eighth embodiment. A system configuration and an operation environment according to the ninth embodiment are the same as those in the first embodiment.

In the ninth embodiment, similarly to the eighth embodiment, the connection target of the UE 100 is switched from the AP 300 to the eNB 200. In the ninth embodiment, the AP 300 transmits, to the eNB 200, request information requesting to switch to the eNB 200, when the connection target of the UE 100 is switched from the AP 300 to the eNB 200. Then, the AP 300 transmits, to the UE 100, instruction information instructing to switch to the eNB 200, when a response to the request information is received from the eNB 200.

Figure 28:
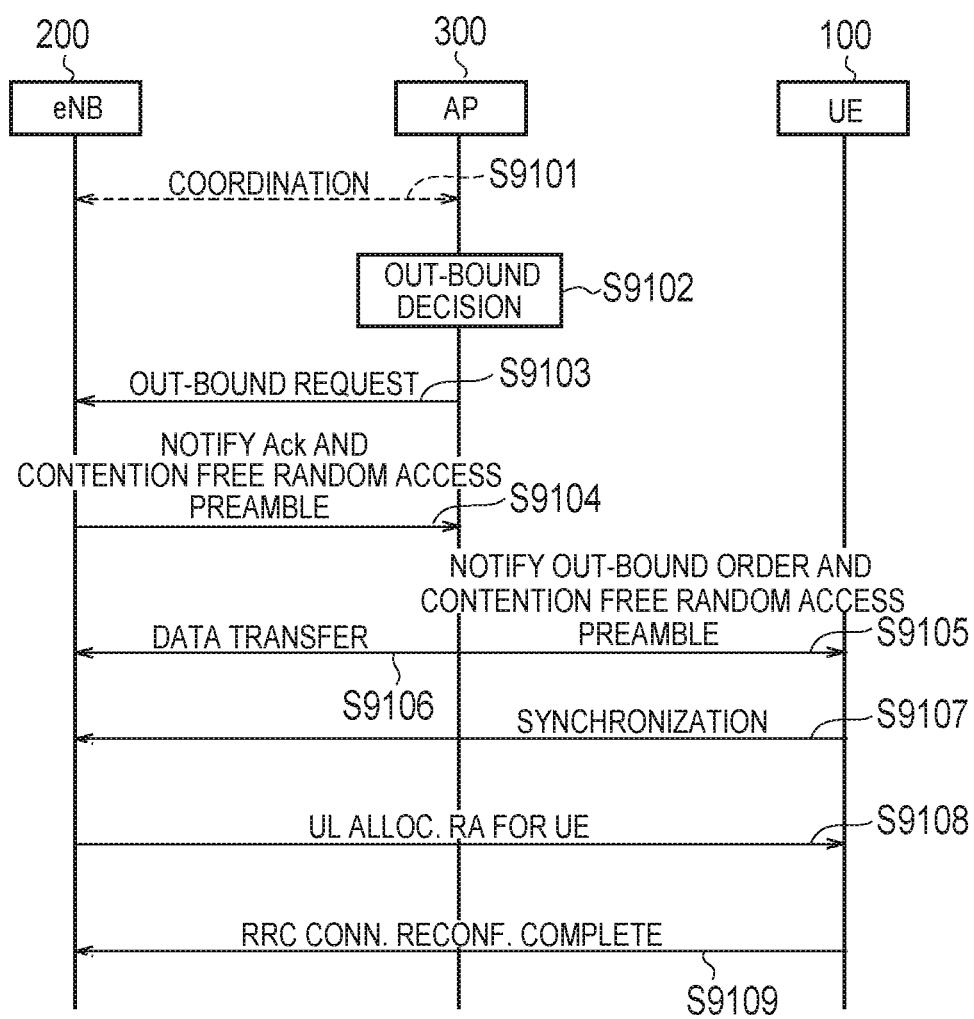
FIG. 28 is a sequence diagram according to the ninth embodiment.

FIG. 28 is a sequence diagram according to the ninth embodiment. In an initial state of FIG. 28, the UE 100 is connected to the AP 300. Further, the eNB 200 and the AP 300 perform a negotiation for operating in interworking with each other (step S9101). In this case, the AP 300 confirms whether the AP 300 is arranged within the coverage of the eNB 200.

As shown in FIG. 28, in step S9102, the AP 300 determines whether or not to switch the connection target of the UE 100 from the AP 300 to the eNB 200, on the basis of the load level of the AP 300.

In this case, the AP 300 is arranged within the coverage of the eNB 200, and the UE 100 connecting to the AP 300 is ensured that radio quality with the eNB 200 is equal to or more than a predetermined level. As a result, the AP 300 is capable of determining to switch the connection target of the UE 100 to the eNB 200, without receiving the measurement report on the eNB 200 from the UE 100.

In this case, description is provided on the assumption that the AP 300 decides that a connection target of the UE 100 is switched from the AP 300 to the eNB 200.

In step S9103, the AP 300 transmits, to the eNB 200, request information requesting to switch to the eNB 200.

In step S9104, the eNB 200 transmits, to the AP 300, in addition to a response (Ack) relative to the request information from the AP 300, information (such as contention free and preamble) used for a connection procedure to the eNB 200.

In step S9105, the AP 300 transmits, to the UE 100, a switch instruction to switch from the AP 300 to the eNB 200, in response to the receipt of the response (Ack) from the eNB 200. The switch instruction includes information used in the connection procedure to the eNB 200.

In step S9106, the AP 300 transmits, to the eNB 200, the switch instruction to the UE 100, and transfers the transmission data addressed to the UE 100.

In steps S9107 to S9109, the UE 100 performs a connection process with the eNB 200.

Instead of AP 300, a cellular base station that performs communications in an unlicensed band may be used in the ninth embodiment.

Other Embodiments

While the present disclosure has been described by way of the foregoing embodiments, as described above, it should not be understood that the statements and drawings forming a part of this disclosure limit the disclosure. From this disclosure, a variety of alternate embodiments, examples, and applicable techniques will become apparent to one skilled in the art.

Each of the above-described first embodiment to ninth embodiment may be individually implemented and implemented in combination of one another.

In each of the above-described embodiments, a case where the eNB 200 and the AP 300 are a separate device is described; however, the eNB 200 may include a function of the AP 300. That is, the eNB 200 may include a WLAN transceiver. Further, the eNB 400 may include a function of the AP 300.

In the above-described embodiments, secure communication between the UE 100 and the AP 300 has not been particularly considered; however, such secure communication may be considered. The eNB 200 inquires, the UE 100 determined to be connected to the AP 300, of the presence or absence of connection setting information used in the secure communication with the AP 300. When such connection setting information is not provided in the user terminal, the eNB 200 requests the AP 300, which is to be connected, to issue temporary connection setting information. Then, the temporary connection setting information issued by the AP 300 in response to the request from the eNB 200 is notified to the UE 100 from the AP 300 via the eNB 200. Detailed procedures will be described, below.

Firstly, the eNB 200 transmits, to the UE 100, WLAN connection setting confirmation information for inquiring the presence or absence of a connection setting (secure setting) with the AP 300 that is to be connected to. The WLAN connection setting confirmation information includes an identifier (SSID/ESSID) of the AP 300 to be connected.

Secondly, the UE 100 sends back, to the eNB 200, a WLAN connection setting response indicating the presence or absence of the connection setting of the inquired AP 300. The WLAN connection setting response includes the identifier (SSID/ESSID) of the AP 300 to be connected.

Thirdly, the eNB 200 transmits issuance request information requesting to issue a temporary connection setting, to the AP 300 to be connected, when there is no connection setting in the WLAN connection setting response. The issuance request information includes MAC-ID of the WLAN of the UE 100.

Fourthly, the AP 300 generates the temporary connection setting information in response to the issuance request information from the eNB 200, and notifies the eNB 200 of the information. The temporary connection setting information includes information on the secure settings (a secure type and a secure key).

Fifthly, the eNB 200 adds the identifier (SSID/ESSID) of the AP 300 to the temporary connection setting information from the AP 300, and transfers the same to the UE 100. The eNB 200 may include the temporary connection setting information in the above-described scanning instruction.

In the above-described embodiments, whether the WLAN service is available to the UE 100 has not been particularly considered; however, whether the WLAN service is available to the UE 100 may be considered. The eNB 200 inquires a service management server of whether the UE 100 connecting to the cell of the eNB 200 is registered in a service allowing the use of the AP 300. The eNB 200 may transmit, from the eNB 200 to the UE 100, authentication information for registering in the service when the UE 100 is not registered in that service. Detailed procedures will be described, below.

Firstly, the eNB 200 transmits, to the service management server, service registration confirmation information for inquiring the presence or absence of the service registration in a WLAN network. The service registration confirmation information includes an identifier (such as MAC-ID) of the UE 100.

Secondly, the service management server sends back, to the eNB 200, service registration information indicating the registration in the WLAN service. The service registration information includes an identifier (such as MAC-ID) of the UE 100.

Thirdly, the eNB 200 transmits a scanning instruction (WLAN connection request) to the UE 100 when there is a service contract in the service registration information from the service management server. On the other hand, when there is no service contract, the eNB 200 does not transmit the scanning instruction to the UE 100. Alternatively, the eNB 200 decides to provide a temporary service, and transmits, to the UE 100, authentication information for a temporary login setting for the service, that is, a service authentication key (an authentication ID, a password).

In the above-described embodiments, as one example of the cellular communication system, the LTE system is described; however, the present disclosure is not limited to the LTE system, and the present disclosure may be applied to a cellular communication system other than the LTE system.

It is described that a white list is a list of connectable APs 300 (Planned AP); however, a list of APs 300 to which the UE 100 should not connect may be added to the white list.

Hereinafter, additional statements of the above-described embodiments will be described.

[Additional Statement 1]

One of the main objectives of the 3GPP/WLAN interworking study item is to extend the interworking between 3GPP and WLAN beyond the integration currently supported at the CN level. To improve the overall user experience, further enhancements at the RAN level is needed to achieve better network utilization, reduce unnecessary UE power consumption and provide seamless mobility between the two networks. This contribution considers some of the scenarios necessary to achieve these objectives.

Based on the study item, the initial phase of the study item is to identify requirements for RAN level interworking, and clarify the scenarios to be considered in the study while taking into account existing standardized. The scenarios considered below will involve enhancements to the current system and the proper UE behaviours should be further analysed.

For 3GPP/WLAN interworking, the operator could consider various deployment options. In general, WLAN APs may be deployed in various locations. For coverage extension, WLAN may even be deployed in areas where 3GPP access networks are not available. However, for 3GPP/WLAN interworking RAN2 should only focus on the scenario where WLAN is overlaid on the 3GPP system, regardless of whether the WLAN AP is co-located or not with any of the 3GPP nodes.

Observation: 3GPP/WLAN interworking is only applicable for offloading whereby WLAN is within coverage of 3GPP systems.

In Release 10 simultaneous network connections to multiple radio access technologies have been enabled by MAPCON, IFOM and non-seamless WLAN offload. To take this into account, the ANDSF framework has been enhanced with the introduction of Inter System Routing Policies (ISRP), allowing the operator to provide policies based on the traffic exchanged by the UE. In Rel-11, the extensions to ANDSF and Inter-System Routing Policies (ISRP) provide to operators a better control of the network resources used for each application or IP flow. As an example, the operator may indicate via ANDSF policies that IP flows which require a data rate above a certain threshold are to be sent over a given access.

However, these network enhancements do not address the issue of UE power consumption for the purpose of offloading. Offloading provides the network with freed up resources for other UEs that cannot be offloaded to a WLAN AP. Offloading to a WLAN AP is also beneficial when the 3GPP radio or network is congested. Although there are significant advantages for offloading from a network's perspective, it should not be necessary to have both 3GPP radio and WLAN radio turned on at all times since it will cause excessive power consumption at the UE, esp. if WLAN APs are more widely deployed. This study item should consider scenarios directed towards power savings. In particular, an efficient means for WLAN discovery to prevent the UE from searching for WLAN continuously when no WLAN AP is available to the UE. An efficient WLAN discovery mechanism may not assume the UE will have its WLAN client turned on at all times. Therefore, the selection of a UE for offloading to WLAN should also be carefully considered depending on the WLAN discovery mechanism. Furthermore, the selection of a candidate UE for offloading to WLAN should not only be based on its relative proximity to a WLAN AP but also the appropriateness of the services suitable for WLAN due to backhaul latency.

Proposal 1: To improve UE's energy consumption, an efficient means for WLAN AP discovery should be considered.

For interworking with WLAN, the services that may be suitable for offloading should be considered. Due to the uncertainly in reliability and the potential increased latency associated with the backhaul used by the WLAN AP, some services e.g., VoIP may not be suitable for offloading whereas latency tolerant services would be ideal candidate for offloading. Therefore RAN2 should consider the UE's connectivity based on its active services. To have an effective interworking between the two systems, UE's behaviour for both inbound mobility to the WLAN and outbound mobility from the WLAN should be considered. Inbound mobility to the WLAN may be needed when the 3GPP network decides that the one or more of the UE's active services should be offloaded to WLAN. Although UE's active services are offloaded to WLAN, it is assumed that the UE will remain in IDLE on the 3GPP system, e.g., to receive incoming pages. If the UE were to activate a new service that is not suitable for WLAN, RAN2 should consider procedures necessary for outbound mobility from WLAN to the 3GPP system. RAN2 should further consider whether all services need to be transferred from the WLAN to the 3GPP system, or if only services not applicable for WLAN would be transferred to the 3GPP system. UE's power consumption should also be considered if it is necessary for UE to simultaneously connect with both systems.

Proposal 2: For providing reliable mobility, the UE's behaviour for both inbound mobility to WLAN and outbound mobility from WLAN should be considered.

This additional statement 1 described a few scenarios that should be addressed in this study item.

[Additional Statement 2]

1. Introduction

As a result of the discussion about how solutions (Solution 1, 2 and 3) can fulfill the requirements, Solution 2 seems to fulfill all requirements; although there remain a few unclear points, especially as they relate to ANDSF and RAN rules. This contribution provides further explanation on the differences and how they may be used to meet the traffic steering requirements. Further details on the fulfilment of requirements for Solution 2 are described in the Annex.

2. Discussion 2.1. ANDSF vs RAN Rules

A few unclear points were described under Solution 2 for fulfillment of all requirements. Majority of the concerns come from the relationship between ANDSF policy and RAN rules. For example, some concerns come from the unpredictability of UE behavior or potential ping-ponging caused by unclear relationship between ANDSF policy and RAN rule. The answers to the issues below should help to clarify the relationships between ANDSF and RAN rules.

1) If ANDSF is not available, should RAN rules be used?

If ANDSF is not available, RAN should provide rules to ensure consistent behavior among UEs. Pre-provisioning of UEs with static rules may lead to unpredictable behavior since this is basically up to UE implementation. This flexibility is one of main advantages with Solution 2.

2) If ANDSF is available to the UE, which rule should the UE follow, ANDSF policy, RAN rules or both?

It is currently stated that, "Even if the ANDSF policy is provided to the UE, RAN has the option to indicate the preferred rule to be used by the UE". In principle, the UE should be allowed to use ANDSF if it is available to the UE and the UE supports ANDSF. However, to prevent any confusion, the decision of which rule to use is up to RAN to decide. If RAN knows that UE has ANDSF available, RAN should allow the UE to use ANDSF. If we allow the UE to use ANDSF when RAN has informed the UE that RAN rules should be used then the use of ANDSF would be left to UE implementation which would prevent uniform behavior among all UEs. Therefore, either the RAN rules or ANDSF policy would be used as decided by the RAN and not both.

3) If ANDSF is only available to some UEs but not all UEs (maybe some UEs are not ANDSF capable) could the RAN provide its rules only to those UEs without ANDSF?

It will be up to the RAN to decide whether to apply RAN rules or ANDSF policy. In our view, RAN rule should be provided to all UEs without distinction to avoid any confusion.

4) Do we apply the same rules for roaming UEs? Will the roaming UEs have the same ANDSF as the non-roaming UEs? Is it necessary for the roaming UEs to behave the same way as the non-roaming UEs?

Again, it will be up to the RAN to decide whether the UE uses RAN rule or ANDSF. Roaming UE's behavior can be predictable for operators if the UE performs traffic steering based on the rule provided by RAN. It is also good for load balancing.

5) Are there any cases where UE implementation is allowed when the UE is informed by the RAN to use RAN rules?

Following RAN rules does not imply the UE will automatically scan for WLAN and steer traffic to WLAN. RAN rules assume the UE may also account for its battery level status as part of WLAN scanning optimization. Details of WLAN scanning optimization is FFS. For traffic steering from RAN to WLAN, the UE selects traffic to be steered based on the specified DRB within RAN rules. For the selection of traffic to be steered from WLAN to RAN, the UE may use IFOM if available or UE implementation.

Table 1 summarizes the relationship between RAN rules and ANDSF.

TABLE 1

| RAN's Rule Preference | UE's action (if ANDSF is Available) | UE's action (if ANDSF is Unavailable) |
|---|---|---|
| RAN Rules | RAN Rules | RAN Rules |
| ANDSF Policy | ANDSF Policy | UE uses legacy behavior |

Based on the above clarifications, we arrived at the following conclusions:

For Solution 2, RAN decides whether the UE uses RAN rules or ANDSF policy.

Proposal 1: If RAN decides that UE should use RAN rules, the UE will only use RAN rules even if ANDSF is available.

Proposal 2: If RAN decides that UE should use RAN rules, traffic steering from RAN to WLAN will be according to the traffic information which defines the data bearer selected for offloading.

Proposal 3: For traffic steering from WLAN to RAN, the UE may select traffic according to UE implementation or IFOM (if available).

2.2. Clarification on Load Information

In previous discussions, there were suggestions that RAN may indicate its load to the UE in order to trigger the traffic steering from RAN to WLAN. Such an indication has no benefit for operators. For load balancing, Solution 2 allows the RAN to adjust thresholds of 3GPP RAN RSRP, RSCP, WLAN BSS load and WLAN RSSI to vary the level of offloading desired. Additionally, accuracy of access network selection is also improved by using direct metrics rather than indirect metrics such as load information.

Figure 29:
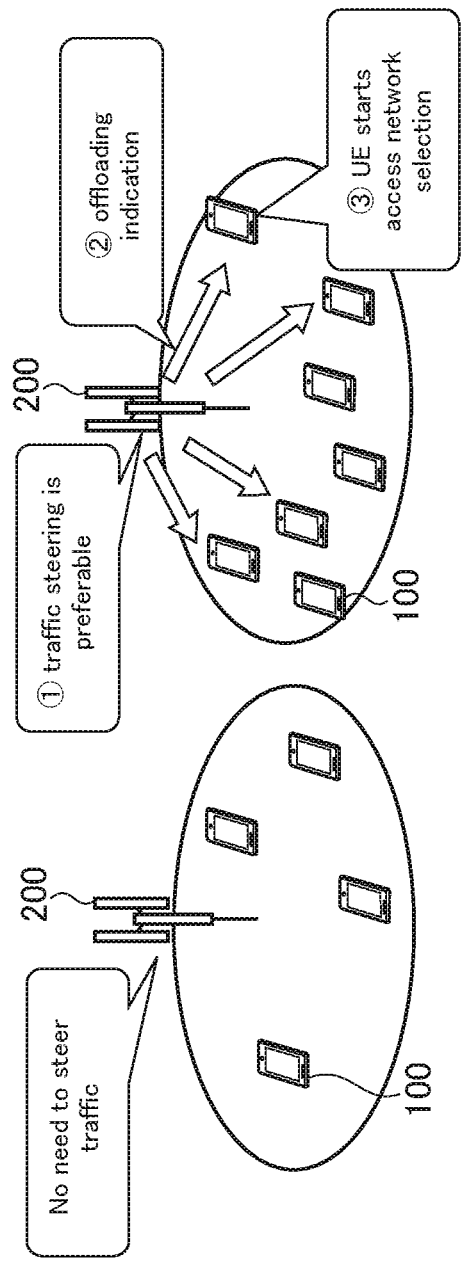
FIG. 29 is a diagram for illustrating an operation according to other embodiments.

Furthermore, Solution 2 can avoid inefficient scanning, traffic steering using offloading indication (refer to FIG. 29). If load level increases, RAN promotes network selection by sending an offload indication to the UE. UE initiates network selection using this indication as a trigger. The use of such an offload indicating will prevent any unnecessary scanning of WLAN esp. in the likely case when users turn off the UE's WLAN module to conserve power. The UE will only consider turning on the WLAN module if it receives the offload indication.

Proposal 4: For Solution 2, RAN may send an offload indication to inform the UEs of its intention for offloading from RAN to WLAN.

Proposal 5: Even if UE receive the offload indication from RAN, UE has the option to determine whether WLAN scanning is preferable based on UE implementation, e.g., battery level.

The left side of FIG. 29 indicates the case there is no need to perform traffic steering. The right side of FIG. 29 indicates UE initiates network selection using the offloading indication.

3. Conclusion

This additional statement 2 provides further explanation especially for the unclear points, describes refinement of Solution 2 and concludes the solution fulfils all the requirements.

4. Annex 4.1. Evaluation of Requirement Fulfillment

With the above clarfications of ANDSF and RAN rules, it would be of interest to reconsider whether Solution 2 satisfies the requirement fulfillments.

Requirement 1:

Solution 2 achieves the proper balance between RAN load and WLAN load APs by utilizing ANDSF or RAN rules. In particular, RAN rules will specify thresholds for 3GPP/WLAN signals and WLAN load to control traffic steering without explicitly providing RAN's load information. Even if ANDSF were available to the UE, RAN will decide whether ANDSF or RAN rules will be ultilized to avoid any potential conflict between the two.

If ANDSF is unavailable to UEs, even with smart UE implementation, the policies used by the UEs may be different, so the outcome of the offloading may still be uncertain. With RAN rules, UE's behaviour is predictable which leads to predictable offloading control.

Unlike Solution 1, Solution 2 has the advatange that RAN can control the timing of applying the rules which should result in more accurate offloading control. For dynamic load control, RAN has the option to adjust thresholds as needed to enable timely access network selection.

Requirement 2:

User experience may be improved by specifying the rule that reflects RAN/WLAN signal qualities and WLAN load. The RAN specified theresholds and takes into account of existing 3GPP measurement reports, RAN state and the relative load generated by the UE so that both user experience and network performance may be improved.

Since Solution 2 is a UE-based access network selection solution, UE-specific needs such as steering IP flow rather than just DRB can be more easily fulfilled with less signaling.

Requirement 3:

For improving utilization of WLAN, improving user experience and reduction of battery consumption are needed. From this perspective, Solution 2 satisfies the requirement by allowing the UE to take into account of its battery level, proximity to WLAN and QoS needs to achieve the desired results.

Randomization may be applied to prevent excessive number of UEs from connecting to WLAN simultaneously.

Furthermore, offloading indication from RAN may be used to prevent unnecessary WLAN scanning. UE initiates this procedure only if the indication is activated.

Requirement 4:

By specifying rules that allows the UE perform WLAN scanning only when certain RAN conditions are satisfied, battery consumption may be reduced. For instance, by allowing the UE to scan WLAN channel only when RSRP is less than a certain threshold, UE's power consumption may be reduced.

Requirement 5:

If RAN decides that the UE should use ANDSF, then the traffic steering may be based on ANDSE If ANDSF is unavailable and the RAN decides that the UE should use RAN rules, the RAN may decide which traffic would be optimal for offloading to WLAN.

Requirement 6:

Solution 2 does not affect existing 3GPP and WLAN functionalities, so there is no impact to legacy systems.

Requirement 7:

Solution 2 follows existing WLAN scanning/connection mechanisms, so there is no impact to IEEE or WFA.

Requirement 8:

RAN may provide to the UE a white list (or black list) consisting of WLAN service set identifiers so that WLAN system distinction is possible. It is also possible to provision per SKID-thresholds.

In addition, Solution 2 may also rely on ANDSF to define WLAN specific system for offloading. RAN policy may also make use of existing ANDSF policy.

Requirement 9:

The fulfillment of this requirement is accomplished through the use of dedicated signalling for specific UEs.

Requirement 10:

By utilizing randomization (e.g. UE performs random backoff before testing whether the target cell is accessible or not) and providing a dedicated assistant information (e.g. threshold) for each UE, ping-ponging may be prevented. It is FFS whether additional mechanisms are needed.

[Additional Statement 3]

Rule Example:
if ANDSF is not available (or not preferred by RAN)
  if RAN RSRP<x or offloading indicator=yes
    if WLAN RSSI>y and WLAN BSS load<z
      offload from RAN to WLAN
  else if RAN RSRP>x'
    if WLAN RSSI<y' or WLAN BSS load>z'
      offload from WLAN to RAN
else forwards the received assistance information to the interworking upper layer of the UE Note: Parameters x, x', y, y', z, z' are provided by Network Splitting Between "if RAN RSRP<x or Offloading Indicator==Yes" and "if WLAN RSSI>y and WLAN BSS Load<z"

The motivation is UE can allow to be scanning optimization (including WLAN client off) if RAN RSRP>x and offloading indicator==no or not signaled. And UE do RAN RSRP measurement regardless scanning optimization is applied or not.

The Reason Two Thresholds "if RAN RSRP<x" and "Offloading Indicator==Yes" Having Even if RAN does not indicate offloading desired, the UE may still want to scan for WLAN. It's just a way for the RAN to determine how many potential UEs may not be offloaded (i.e., those UEs with RSRP>x). That way the UE may still report WLAN measurements to the eNB, but that they wouldn't be targeted for offloading to WLAN. Sort of like MDT. So that RAN can refine the adjustment of "x" in the future. This would only be applicable for dedicated signaling.

The Reason "if WLAN RSSI<y' or WLAN BSS Load>z'" then UE should Offload from WLAN to RAN It's dangerous the decision offload from WLAN to RAN is up to UE implementation or ANDSF. The important thing here is that the RAN rules can still be applied to determine if the UE should steer traffic from WLAN to RAN; however, the selection of traffic to be steered from WLAN to RAN will be based on UE implementation. (I.e., If UE applying RAN rules move to WLAN, RAN rules should also be used during UE. So UE applying RAN rules should keep its RAN rules until UE receive updated parameters (after move back to RAN) to prevent unnecessary ping-pong NW selection. Note Rule preference indicator is included in above "updated parameters".

The Necessity of Offload Preference Indicator

Listed parameters are provided by dedicated signaling or broadcast signaling (More specific, whether all listed parameters are provided by dedicated signaling or there is a possibility that some parameters can be provided by broadcast signaling.) If there is a situation that RSRP threshold and WLAN related threshold are provided by broadcast signal whereas remaining parameters are provided by dedicated signaling, RAN should not change RSRP threshold drastically. Then the Offload preference indicator is useful for NW making only UEs located in close to the WLAN move to WLAN, (if NW knows WLAN and UE's location.)

Of course, there is another possibility that NW send the updated parameters x, y, z by dedicated signaling instead of Offload preference indicator.

To summarize above procedure, UE may obey the rules described in below table 2.

TABLE 2

| | | If UE connect to WLAN | If UE connect to RAN |
|---|---|---|---|
| Assuming RAN load level isn't acceptable | RSRP < x Offload preference indicator == yes | N/A | if (WLAN RSSI > y and WLAN BSS load < z ) => Traffic steering based on RAN rule else => RAN |
| | RSRP > x Offload preference indicator == yes | N/A | if (WLAN RSSI > y and WLAN BSS load < z) => Traffic steering based on RAN rule else => RAN |
| Assuming RAN load level is acceptable | RSRP < x Offload preference indicator == no | N/A | if (WLAN RSSI > y and WLAN BSS load < z) => Traffic steering based on RAN rule else => RAN |
| | RSRP > x Offload preference indicator == no | N/A | RAN |
| | RAN RSRP > x' | if (WLAN RSSI < y' or WLAN BSS load > z') => Traffic steering based on UE implementation else => WLAN | N/A |
| | RAN RSRP < x' | WLAN | N/A |

INDUSTRIAL APPLICABILITY

The present disclosure is useful for radio communication fields.

The invention claimed is:

1. A base station included in a cellular radio access network (RAN), comprising:
a transmitter configured to transmit, to a user equipment in Radio Resource Control (RRC) connected mode, via dedicated signaling, dedicated parameters for an offload from the cellular RAN to a wireless local area network (LAN), wherein
the dedicated parameters are used by the user equipment to perform an access network selection between the cellular RAN and the wireless LAN,
the dedicated parameters include a first threshold to be compared with a cellular signal strength of the cellular RAN, a second threshold to be compared with a wireless LAN signal strength of the wireless LAN, and a third threshold to be compared with a load of the wireless LAN, and
the transmitter is configured to broadcast, to a user equipment in RRC idle mode, common parameters for the offload.

2. The base station according to claim 1, wherein
when the user equipment performs the access network selection, the dedicated parameters cause the user equipment to perform the offload, in response to the cellular signal strength being lower than the first threshold, the wireless LAN signal strength being higher than the second threshold, and the load of the wireless LAN being lower than the third threshold.

3. A method performed at a base station included in a cellular radio access network (RAN), comprising:
transmitting, to a user equipment in Radio Resource Control (RRC) connected mode, via dedicated signaling, dedicated parameters for an offload from the cellular RAN to a wireless local area network (LAN), wherein
the dedicated parameters are used by the user equipment to perform an access network selection between the cellular RAN and the wireless LAN,
the dedicated parameters include a first threshold to be compared with a cellular signal strength of the cellular RAN, a second threshold to be compared with a wireless LAN signal strength of the wireless LAN, and a third threshold to be compared with a load of the wireless LAN, and
the method further comprises broadcasting, to a user equipment in RRC idle mode, common parameters for the offload.

4. A base station included in a cellular radio access network (RAN), comprising:
a controller configured to acquire information indicating whether a user equipment supports an offload from the cellular RAN to a wireless local area network (LAN) based on parameters provided by the cellular RAN, and
a transmitter configured to transmit, to the user equipment, parameters for the offload from the cellular RAN to the wireless LAN, wherein
the parameters are used by the user equipment to perform an access network selection between the cellular RAN and the wireless LAN, and
the parameters include a first threshold to be compared with a cellular signal strength of the cellular RAN, a second threshold to be compared with a wireless LAN signal strength of the wireless LAN, and a third threshold to be compared with a load of the wireless LAN.

* * * * *